US012789217B2

(12) United States Patent
Birmelin

(10) Patent No.: US 12,789,217 B2
(45) Date of Patent: Nov. 10, 2026

(54) JOINT WITH A FLUID LINE ARRANGED INSIDE, DOUBLE JOINT, SANITARY ASSEMBLY AND CORRESPONDING USE

(71) Applicant: Neoperl GmbH, Müllheim (DE)

(72) Inventor: David Birmelin, Müllheim (DE)

(73) Assignee: Neoperl GmbH, Müllheim (DE)

( * ) Notice: Subject to any disclaimer, the term of this patent is extended or adjusted under 35 U.S.C. 154(b) by 182 days.

(21) Appl. No.: 18/836,494

(22) PCT Filed: Nov. 25, 2022

(86) PCT No.: PCT/EP2022/083324
§ 371 (c)(1),
(2) Date: Aug. 7, 2024

(87) PCT Pub. No.: WO2023/156037
PCT Pub. Date: Aug. 24, 2023

(65) Prior Publication Data

US 2025/0144657 A1 May 8, 2025

(30) Foreign Application Priority Data

Feb. 16, 2022 (DE) ......................... 202022100877.9

(51) Int. Cl.
*B05B 15/654* (2018.01)
*F16L 27/047* (2006.01)
*F16L 27/06* (2006.01)

(52) U.S. Cl.
CPC .......... *B05B 15/654* (2018.02); *F16L 27/047* (2013.01); *F16L 27/06* (2013.01)

(58) Field of Classification Search
CPC ......... F16L 27/02; F16L 27/023; F16L 27/04; F16L 27/047; F16L 27/06; B05B 15/654
See application file for complete search history.

(56) References Cited

U.S. PATENT DOCUMENTS

| | | | | |
|---|---|---|---|---|
| 4,946,202 | A * | 8/1990 | Perricone | F16L 27/04 |
| 8,956,236 | B2 * | 2/2015 | Chu | B25B 13/06 |
| 11,041,523 | B2 * | 6/2021 | Chen | F16C 11/0685 |
| 2012/0242081 | A1 | 9/2012 | Keays et al. | |
| 2015/0252555 | A1 | 9/2015 | Huang | |
| 2021/0205825 | A1 | 7/2021 | Zhou | |

FOREIGN PATENT DOCUMENTS

| | | | |
|---|---|---|---|
| CN | 1675435 | A | 9/2005 |
| CN | 201406702 | Y | 2/2010 |
| CN | 101812858 | A | 8/2010 |
| CN | 209688145 | U | 11/2019 |
| CN | 219775106 | U | 9/2023 |
| DE | 3623542 | C1 | 12/1987 |

(Continued)

*Primary Examiner* — Zachary T Dragicevich
(74) *Attorney, Agent, or Firm* — Volpe Koenig

(57) ABSTRACT

A joint (1) having a fluid line (9) disposed in the interior of the joint (1) is provided, with the joint (1) including a first joint element (2) and a second joint element (3) for receiving the first joint element (2), the first joint element (2) in the second joint element (3) being freely pivotable in space about a pivot point. The first joint element (2) and/or the second joint element (3) include an anti-twist device which prevents the first joint element (2) rotating within the second joint element (3).

23 Claims, 31 Drawing Sheets

(56) References Cited

FOREIGN PATENT DOCUMENTS

| | | | | | |
|---|---|---|---|---|---|
| DE | 20215396 | U1 | * | 3/2003 | ........... B05B 15/654 |
| DE | 102004042965 | B4 | | 5/2007 | |
| DE | 202006018395 | U1 | | 4/2008 | |
| DE | 212007000025 | U1 | | 9/2008 | |
| DE | 102019126094 | A1 | | 4/2021 | |
| DE | 102020110810 | A1 | | 10/2021 | |
| DE | 102022103628 | A1 | | 8/2023 | |
| EP | 1681100 | B1 | | 3/2014 | |
| EP | 2868387 | B1 | | 3/2019 | |
| FR | 2900348 | A1 | * | 11/2007 | .............. F16L 27/04 |
| TW | 200704893 | A | | 2/2007 | |
| WO | 2007144918 | A1 | | 12/2007 | |

* cited by examiner

JOINT WITH A FLUID LINE ARRANGED INSIDE, DOUBLE JOINT, SANITARY ASSEMBLY AND CORRESPONDING USE

CROSS-REFERENCE TO RELATED APPLICATIONS

This application is a 371 National Phase of PCT/EP2022/083324, filed Nov. 25, 2022, which claims priority from German Patent Application No. 20 2022 100 877.9, filed Feb. 16, 2022, both of which are incorporated herein by reference as if fully set forth.

TECHNICAL FIELD

The invention relates to a joint having a fluid line disposed in the interior of the joint, the joint comprising a first joint element and a second joint element for receiving the first joint element, the first joint element within the second joint element being freely pivotable in space about a pivot point.

The invention furthermore relates to a double joint, to a sanitary assembly, and to the corresponding use of a joint for assembling a shower head.

BACKGROUND

Joints of this type are used as ball joints in fittings, for example, in order to be able to dispose a water outlet of the fitting so as to be freely pivotable within a specific pivot angle.

Water outlets of this type, specifically in the sanitary sector, often include a switchable jet regulator. Such a switchable jet regulator is switchable by rotating the jet regulator or part of the jet regulator, for example, by way of which the flow rate or the flow type of the jet regulator can be set, for example.

In ball joints of this type of a fitting having a jet regulator of this type, there is the issue that the ball joint slips due to the rotation of the jet regulator when switching the jet regulator, and it is therefore not possible to activate the switching function of the jet regulator.

Moreover, the jet regulator located on the ball joint cannot be screwed to the fitting by way of applying a tightening torque to the fitting, as is required in order to enable a tight connection, in most instances by means of a flat seal or a compressed O-ring seal. Therefore, further engagement surfaces for screwing the ball joint to the fitting with a tightening torque are always required in the prior art.

In conventional joints, the friction of the ball joint has usually to be carefully tuned to the friction of the rotational switching mechanism. However, this tuning is prone to errors. Wear arising due to usage, or any change in the joint parts or the arrangement of the latter, can in particular impede or render impossible the handling of the joint, or of the jet regulator connected thereto.

SUMMARY

The present invention is therefore based on the object of providing a joint which has a fluid line disposed in the interior and is freely pivotable in space about a pivot point, the construction of said joint, in particular the ease of handling of the latter, being improved.

This object is achieved in the joint of the type mentioned at the outset in particular in that the first joint element and/or the second joint element comprise/comprises an anti-twist device which prevents the first joint element rotating about a longitudinal axis in the second joint element.

The joint can be freely pivotable within a specific pivot angle and/or about one or a plurality of transverse axes of the joint, for example.

The longitudinal axis herein can relate to the first joint element and/or the second joint element, for example. The rotating movement herein can thus be independent of the pivoting movement, the latter relating to a transverse axis of the first joint element and/or the second joint element, for example. The one or the plurality of transverse axes can be disposed perpendicularly to the longitudinal axis, for example. The longitudinal axis can be disposed, or able to be disposed, along or parallel to the fluid line, for example.

The prevented rotation of the first joint element within the second joint element can be considered a rotation about an axis which is aligned along or parallel to the fluid line, and/or about a connecting axis of the joint elements, for example. The pivotability of the first joint element within the second joint element about a pivot point in space can comprise the preferably free pivotability, or rotation, of the first joint element within the second joint element about one or a plurality of (virtual) (transverse) axes which are aligned transversely to the fluid line. A free pivotability can be achievable, for example, if pivoting is possible about each transverse axis.

The prevented rotatability may be able to be used for transmitting a torque from the first joint element to the second joint element or vice versa, for example, or a counter bearing in relation to a rotating movement of the second (first) joint element may be able to be implemented by a co-rotationally assembled first (second) joint element. For example, this permits a rotational activation which is performed in relation to the respective joint element, for example of a changeover device yet to be described in more detail, to be attached to the second (first) joint element.

Alternatively or additionally, the rotation about an axis which lies transversely, in particular perpendicularly, to all possible pivot axes of the first joint element in the second joint element can also be prevented. This axis can be provided by a longitudinal axis of one of the joint elements.

The axis of prevented rotation can be characterized as an axis about which a transmission of torque from the first joint element to the second joint element (or vice versa) is possible, for example.

In this way, a jet regulator which is connected to the joint, or comprised by a water outlet of the joint, can be easily operated by rotating the jet regulator and without the joint likewise performing a rotating movement. The handling of the joint is thus simplified.

In one design embodiment it is provided that the anti-twist device comprises: a swivel head which is disposed concentrically with the pivot point and has a non-round contour and a swivel head receptacle having a mating contour, preferably corresponding to the non-round contour, for receiving the swivel head.

For example, the swivel head having the non-round contour, a swivel neck which is connected to the swivel head, and/or the mating contour are disposed along that axis which is aligned along or parallel to the fluid direction and about which rotation of the first joint element within the second joint element is prevented.

An anti-twist device which is particularly easy to handle and easy to produce is provided as a result.

In one design embodiment it is provided that the anti-twist device is activatable and/or de-activatable by pivoting the joint. A co-rotational connection is thus easy to engage and disengage. The pivoting preferably takes place about at least one transverse axis. Even more improved use characteristics are derived if pivoting can take place about each transverse axis of the free pivotability. In this instance, it is not necessary to assemble the joint in an oriented manner.

In one design embodiment it is provided that the anti-twist device is produced by a form-fit between the first joint element and the second joint element. In this way, a transmission of torque is possible independently of the specific properties of a friction-fitting connection.

In one design embodiment it is provided that at least one protrusion which at least in one joint position engages in a cutout on the other joint element is formed in the first joint element or the second joint element. Easy handling of the engagement and disengagement of a co-rotational connection by way of the joint is achievable in this way. It is particularly favorable for the co-rotational connection to be cancelled in at least one joint position.

In one design embodiment it is provided that the swivel head is formed on the first joint element, or is co-rotationally connected thereto, and/or that the swivel head receptacle is formed on the second joint element, or is co-rotationally connected thereto.

In another design embodiment it is provided that the swivel head is comprised by the second joint element or is co-rotationally connected thereto, and/or that the swivel head receptacle is comprised by the first joint element or is co-rotationally connected thereto.

A particularly compact construction mode of the joint is achieved as a result.

In one design embodiment it is provided that the anti-twist device is implemented by a mutual engagement of a retaining profile in a corresponding mating retaining profile. The co-rotational connection is produced in a particularly simple manner as a result.

In one design embodiment it is provided that the anti-twist device is designed as a friction clutch. Alternatively or additionally, it can be provided that a friction clutch is formed between the anti-twist device and a sleeve having a thread. In this way, an excessive load on the anti-twist device is avoidable. For example, the anti-twist device is able to be formed from plastic parts in this way.

The thread can be an internal thread or an external thread, for example.

The thread can be formed on the first or the second joint part, for example.

A sealing ring herein can enable the anti-twist device to rotate relative to the thread when applying a torque above a limit torque, for example. It has been demonstrated that a material pairing which is created by using a sealing ring is advantageous for forming a friction clutch.

The sealing ring can be disposed for sealing the thread, for example. An additional component is avoidable in this way.

Alternatively or additionally, it can also be provided herein that the seal ring rests on a part, in particular of a socket, for example the second socket already mentioned, that is rotatable relative to the sleeve. In this way, the friction clutch can enable the part, in particular the swivel head plate, to slip relative to the sleeve even when the sleeve is fixedly screwed to a fitting and cannot rotate any further.

For example, the retaining profile and/or a or the mating retaining profile have/has bevels which enable the first joint element to rotate within the second joint element when a torque above the limit torque is applied.

As a result, the swivel head, or a swivel head plate comprising the swivel head, is protected in relation to being twisted off, as a result of which the swivel head or the swivel head plate can be made of plastics material instead of brass or any other metal or metal alloy, as a result of which production costs can in turn be reduced in particular.

In one design embodiment it is provided that the non-round contour and/or the mating contour are/is designed to be polygonal, in particular hexagonal or octagonal, as a result of which a simple production of the joint is achieved while simultaneously implementing a freely, or substantially freely, pivotable joint.

In one design embodiment it is provided that the swivel head, or a swivel head plate on which the swivel head is formed, comprises one or a plurality of through-bores as at least part of the fluid line. The compactness of the joint is further enhanced as a result.

In one design embodiment it is provided that the or a swivel head plate on which the swivel head is formed comprises one or a plurality of longitudinal slots as at least part of the fluid line. As a result, that part of the fluid line that is comprised by the swivel head, or the swivel head plate, can be enlarged. Furthermore, demolding along these slots is made possible as a result. For example, the slots can be penetrated and an undercut behind protrusions of the swivel head plate can be enabled. This is particularly favorable if the swivel head and/or the swivel head plate are to be produced as an injection-molded part, in particular from plastics material. Easy demolding is achievable in this way.

In one design embodiment it is provided that the swivel head and/or the swivel head receptacle comprise/comprises one or a plurality of bypass ducts, preferably disposed so as to bypass the swivel head, as at least part of the fluid line.

The bypass ducts can be provided alternatively or additionally to the flow bore. The flow can be improved as a result, in particular a cross section of the fluid line can be enlarged, or the flow rate of the fluid line can be increased.

In one design embodiment it is provided that the one or the plurality of bypass ducts are one or a plurality of grooves on the swivel head and/or on the swivel head receptacle. As a result, the production of the joint can be further simplified, and the compactness of the joint can be further enhanced.

In one design embodiment it is provided that the swivel head is of a solid design. This has the advantage that a particularly large pivot angle can be achieved.

In one design embodiment it is provided that the swivel head is of a star-shaped design. The mating contour of the swivel head receptacle herein can be designed in such a manner, for example to be polygonal, so that the fluid duct is formed between the surface of the star-shaped swivel head and the surface of the swivel head receptacle. The flow rate of the fluid line can be increased in such a manner.

In one design embodiment it is provided that the swivel head is a first swivel head and the first joint element comprises a second swivel head, in particular wherein the second swivel head is able to be disposed, preferably in a sealing manner, in a socket of the second joint element and is pivotable freely in space about the pivot point.

The pivotability of the first joint element within the second joint element is achieved in a particularly simple and compact manner in this way.

In one design embodiment it is provided that the swivel head receptacle for the first swivel head is disposed within the second swivel head, and/or wherein the first swivel head is comprised by the socket or is co-rotationally connected thereto.

For example, the swivel head receptacle is disposed concentrically within the second swivel head. Alternatively, the swivel head can be the second swivel head, and the socket can be the swivel head receptacle. In a further alternative, the swivel head having the non-round contour can additionally be formed on the first joint element that comprises the second or the actual swivel head.

The compactness of the joint is further enhanced as a result. Furthermore, a spherical socket in which the second, preferably spherical, swivel head is able to be attached or mounted, can be held so as to be secured against twisting.

In one design embodiment it is provided that the first joint element, the second joint element or a sleeve encompassing the first or the second joint element comprises a connecting portion having a thread for connecting to a fitting, or for connecting to a jet regulator.

This has the advantage that the joint is protected, and attaching the latter to the fitting or the jet regulator is simplified.

In one design embodiment it is provided that the sleeve comprises at least one planar outside surface. The planar outside surface can be a key surface. As a result, attaching the joint to the fitting or the jet regulator by means of a tool can be made possible and thus further simplified.

In one design embodiment it is provided that the first swivel head is comprised by the sleeve or is co-rotationally connected thereto.

A co-rotational connection can be implemented in different ways, by splining and the like, or pins. In this way, a torque can be transmitted, in particular manually, to the sleeve by way of the first joint element, for example for attaching the sleeve to a fitting. In this way, key surfaces on the outside of the sleeve can be dispensed with.

In one advantageous design embodiment it can be provided that an inner tool engagement surface is formed on the first joint element and/or on the second joint element. In this way, direct action can be performed on the respective joint element from the outside. This can be advantageous, for example, if a transmission of torque from a sleeve to a swivel head plate is provided only to an insufficient extent in the non-assembled state.

This can be implemented by an internal hexagon, for example. In this way, a space-saving access to the tool engagement surface is achievable.

A preferred use of the joint according to the invention can provide that a double joint is formed from two joints of this type, in particular as described above and/or as claimed in one of the claims directed toward a joint.

It can be provided herein that the first joint elements are rigidly connected to one another, or that the second joint elements are rigidly connected to one another.

For achieving the object stated in a sanitary assembly having a joint according to the invention, in particular as described above and/or as claimed in one of the claims directed toward a joint, it is provided that a rotationally adjustable changeover device is disposed on the first joint element, or a rotationally adjustable changeover device is disposed on the second joint element. In this way, the co-rotational connection in the joint can form a counter bearing for the movement of the rotational adjustment.

A potential use of a joint according to the invention, in particular as described above and/or as claimed in one of the claims directed toward a joint, is the assembly of a shower head on a water line. This assembly can be performed practically without tools due to the properties of the joint.

BRIEF DESCRIPTION OF THE DRAWINGS

The invention will be described in more detail hereunder by means of a plurality of preferred exemplary embodiments.

In the figures.

DETAILED DESCRIPTION

Figure 1B:
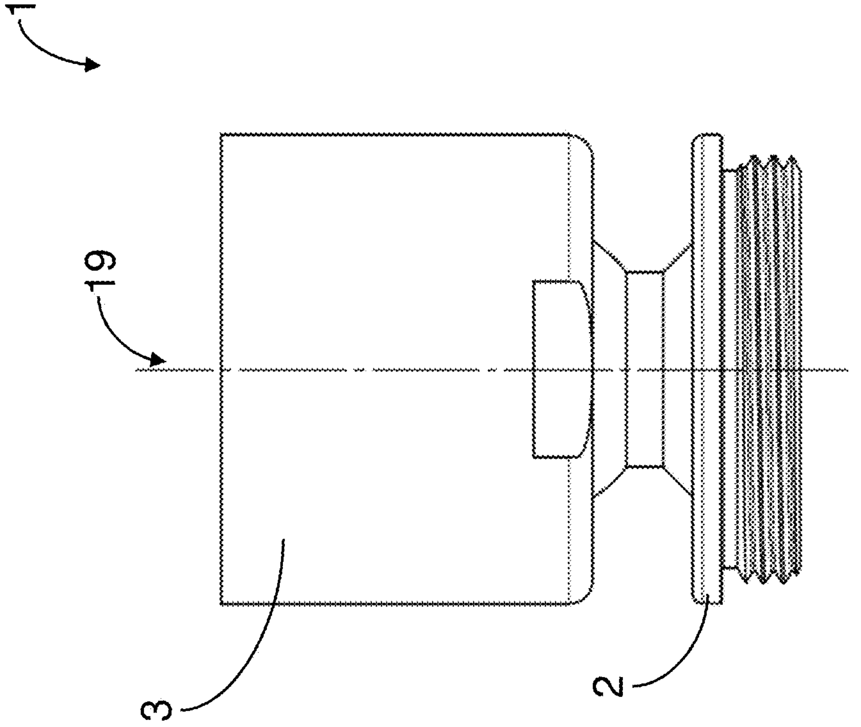
FIG. 1B shows a joint, which is freely pivotable in space, which is aligned along a longitudinal axis of the joint.
Figure 1A:
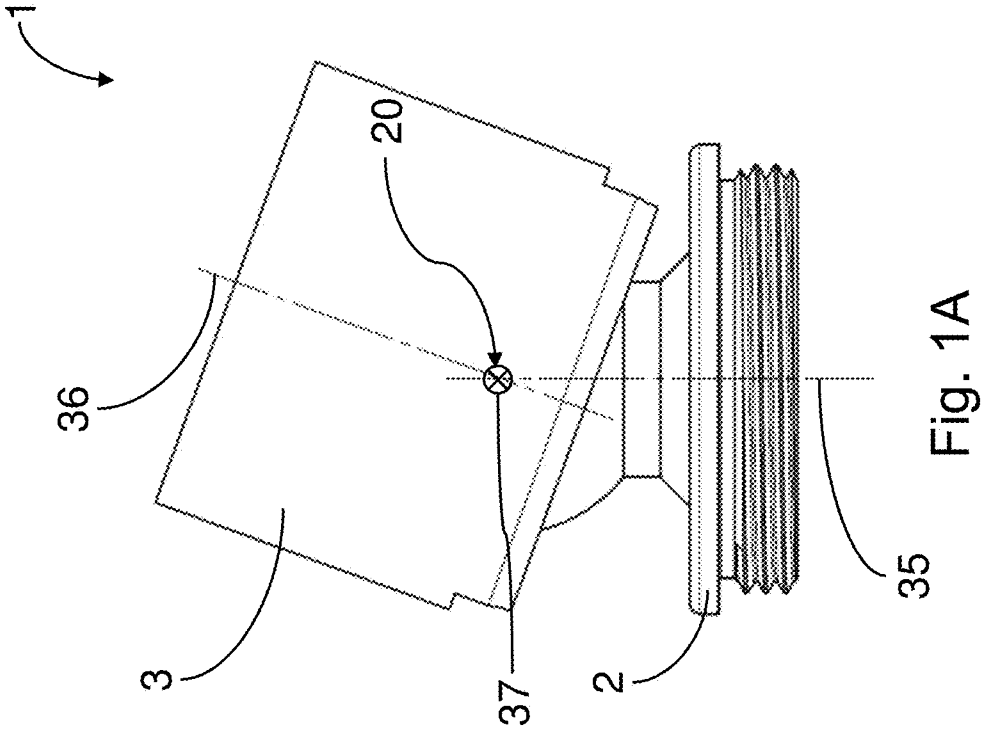
FIG. 1A shows a joint, which is freely pivotable in space, in a pivoted state.

FIGS. 1A and 1B show a joint 1 comprising a first joint element 2 and a second joint element 3, the first joint element 2 in a receptacle of the second joint element 3 being freely pivotable in space, thus about many transverse axes 37, about a pivot point 20 (by way of example, one transverse axis is presently shown to be perpendicular on the drawing plane). The joint is shown in a non-pivoted state in FIG. 1B. The first joint element 2 and the second joint element 3 are aligned along a longitudinal axis 19 of the joint 1. FIG. 1A shows the second joint element 3 which is pivoted about an axis disposed perpendicularly to the image plane. It can be seen that the longitudinal axis 19 of the prolate joint 1 according to FIG. 1A disintegrates into two longitudinal axes 35, 36 which are angled relative to one another, wherein the longitudinal axis 35 is assigned to the first joint element 2, and the longitudinal axis 36 is assigned to the second joint element 3.

Figure 2:
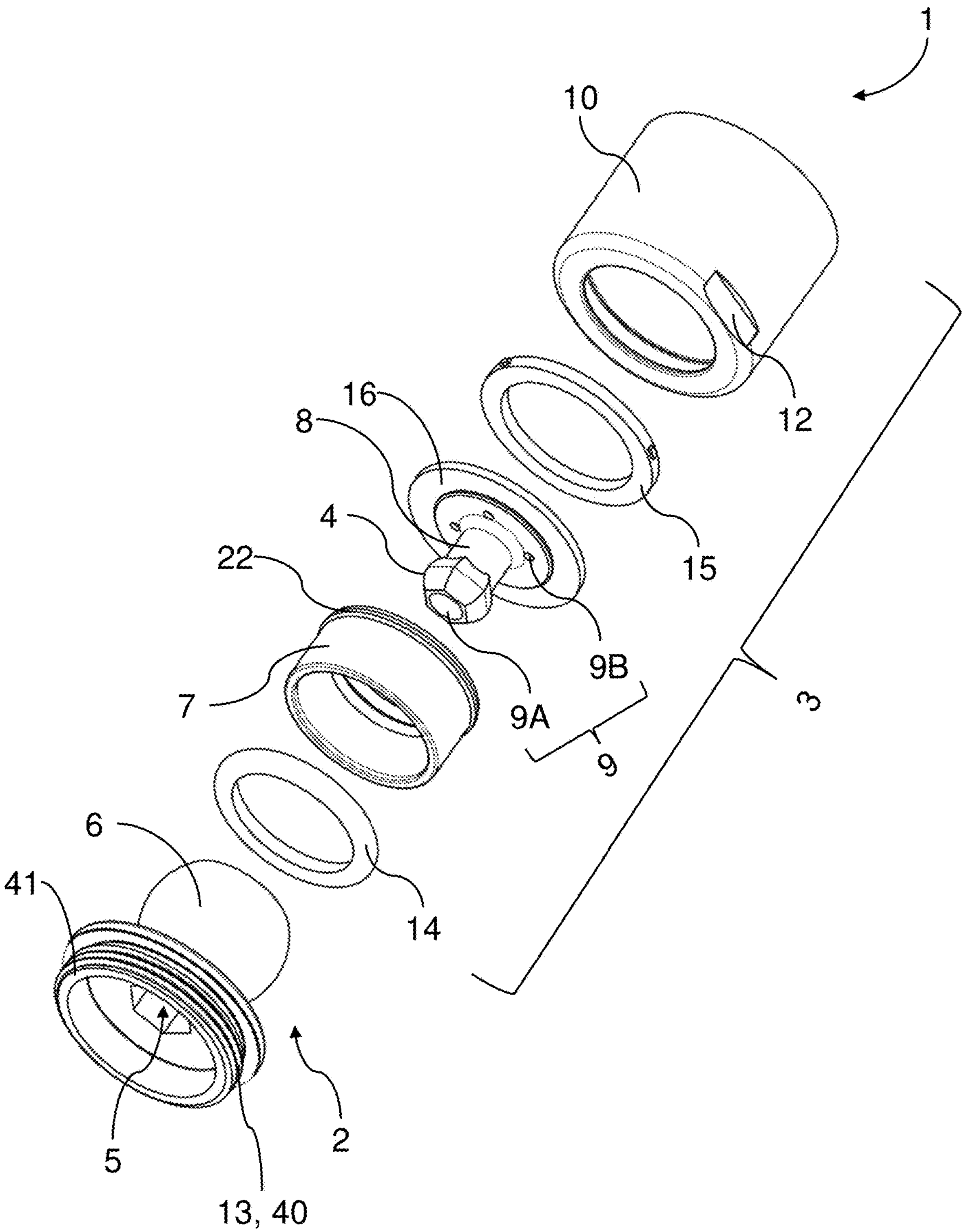
FIG. 2 shows a first embodiment of the joint in an exploded illustration.

FIG. 2 shows a first embodiment of the joint 1 in an exploded illustration. The strict sequence of the parts in an exploded illustration is presently not adhered to for the purpose of improved clarity; instead, the sleeve 10 has been disposed on the extreme right (instead of at the second position from the left).

Features which are identical or similar to those in FIG. 1 are provided with the same reference signs. The second joint element 3 comprises a first swivel head 4 which is disposed concentrically with the pivot point 20 of the joint 1 and has a non-round contour. The non-round contour of the first swivel head 4 in the example shown represents an outwardly bulging, or spherical, hexagon. A base area, or the mutually opposite base areas, of the swivel head 4 are of a hexagonal design.

The first joint element 2 comprises a swivel head receptacle 5, with a mating contour which corresponds to the non-round contour of the first swivel head 4, for receiving the first swivel head 4. The swivel head receptacle 5 in the example shown represents a hexagonal opening. The hexagonal opening has respective parallel lateral faces which are disposed so as to lie opposite one another.

The first joint element 2 comprises a second, or actual, swivel head 6. The second joint element 3 comprises a socket 7 for receiving the second swivel head 6. The second swivel head 6 in the socket 7 is freely pivotable in space about the pivot point 20 of the joint 1. The first swivel head 4 can be fixedly or co-rotationally connected to the socket 7. In other words, a swivel head plate 16 which comprises the first swivel head 4 can be fixedly or co-rotationally connected to the socket 7.

The first swivel head 4 is comprised by the socket 7, or connected to the socket 7, in such a manner that the first swivel head 4 is attachable to the swivel head receptacle 5 of the second swivel head 6 that is attached to the socket 7. In other words: if the second swivel head 6 is disposed or mounted in the socket 7, the first swivel head 4 engages in the swivel head receptacle 5.

The first swivel head 4 with its non-round contour, and the swivel head receptacle 5 with the mating contour receiving the first swivel head 4, conjointly represent an anti-twist device of the joint 1. In other words: the first swivel head 4 cannot be rotated within the swivel head receptacle 5, i.e. cannot rotate about the longitudinal axis 19 of the joint 1 or of the joint elements 2, 3. Yet again in other words: the first joint element 2 in the assembled state of the joint 1 is co-rotationally connected to the second joint element 3, in particular to the socket 7 and/or the swivel head plate 16 having the sleeve 10.

The second joint element 3, more specifically the first swivel head 4, comprises a swivel head neck 8. The swivel head neck 8 connects the first swivel head 4 and the swivel head plate 16.

The joint 1 comprises a fluid line 9 disposed in the interior of the joint 1. In the example shown, the fluid line 9 comprises a first through-bore 9A which extends through the swivel head neck 8 and the first swivel head 4. The fluid line 9 furthermore comprises a plurality of second through-bores 9B in the swivel head plate 16 which supports the swivel head neck 8 and the first swivel head 4. The fluid line 9 shown partially leads through the swivel head 4 and partially bypasses the swivel head 4.

The fluid line 9, or the fluid flow through the fluid line 9, is aligned along the longitudinal axis 19 of the joint 1. In other words: the first joint element 2 within the second joint element 3 is pivotable or rotatable about one axis or a plurality of axes which is/are disposed transversely to an along the fluid line, or the fluid flow, or the longitudinal axis 19 of the joint 1. Rotation about an axis which is disposed along the fluid line, or the fluid flow, or the longitudinal axis 19 of the joint 1 is prevented by the anti-twist device. This axis can be provided, for example, by the longitudinal axis 19 of the prolate joint 1, and/or by one or both of the longitudinal axes 35, 36 of the joint elements 2, 3.

The second joint element 3 comprises a sleeve 10. The sleeve 10 is co-rotationally connectable to the first swivel head 4 and the socket 7. The sleeve 10 comprises a thread 40 designed as an internal thread 11 (cf. FIG. 5) by way of which the sleeve 10 is attachable to a fitting, for example a faucet. The socket 7 and the first swivel head 4 are able to be attached in the sleeve 10, in particular able to be screwed or clipped into the latter. The socket 7 and the swivel head 4 can be fixedly or co-rotationally connected to the sleeve 10, for example by means of a spline or pins. In the example shown, the socket 7 can be connected to the sleeve 10 by way of an undercut 22 which latches into an inside groove 23 on the sleeve 10.

As is illustrated in the example shown, the second swivel head 6 is of a spherical design. Likewise, an inside of the socket 7 is of a hollow spherical design (cf. FIG. 5). In the assembled state, the first joint element 2, in particular the spherical second swivel head 6, is co-rotationally connected to the second joint element 3, in particular to the hollow spherical socket 7, with the aid of the anti-twist device 4, 5.

The sleeve 10 on the external side thereof has a planar surface 12. The planar surface 12 serves as a key surface for providing an engagement surface for a wrench in order to screw the sleeve 10 to a fitting. Owing to the co-rotational connection between the first joint element 2 and the second joint element 3, the screw-fitting can alternatively be performed, in particular manually, by transmitting a torque from the first joint element 2 to the second joint element 3.

The first joint element 2 comprises a thread 40 which is designed as an external thread 13. The external thread 13 is formed on a sleeve 41 which can be designed so as to be integrally connected to the second swivel head 6.

A jet regulator (cf. FIG. 21) can be attached or screwed to the external thread 13, for example.

The joint 1, more specifically the second joint element 3, comprises a first sealing ring 14 for connecting the first joint element 2 to the second joint element 3 in a sealing manner (cf. FIG. 5).

The joint 1, more specifically the second joint element 3, comprises a second sealing ring 15 for connecting the second joint element 3 to a fitting in a sealing manner (cf. FIG. 5).

Figure 3A:
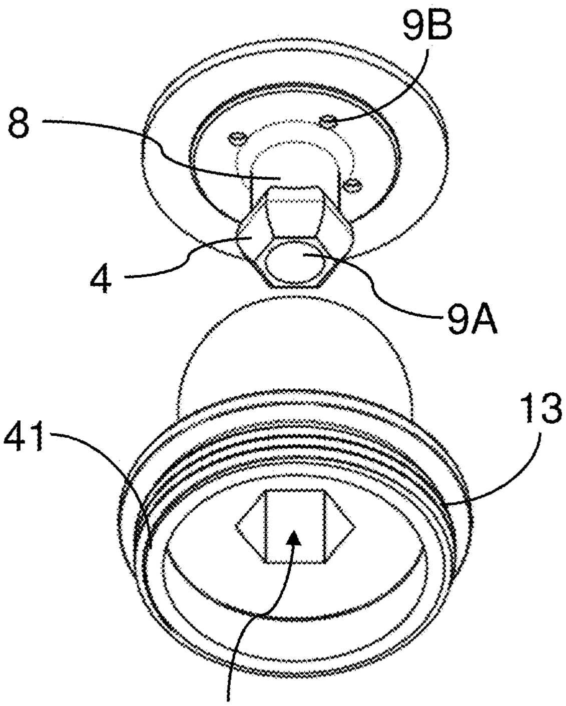
FIG. 3A shows the first joint element and the first swivel head of the first embodiment in a first three-dimensional view.
Figure 3B:
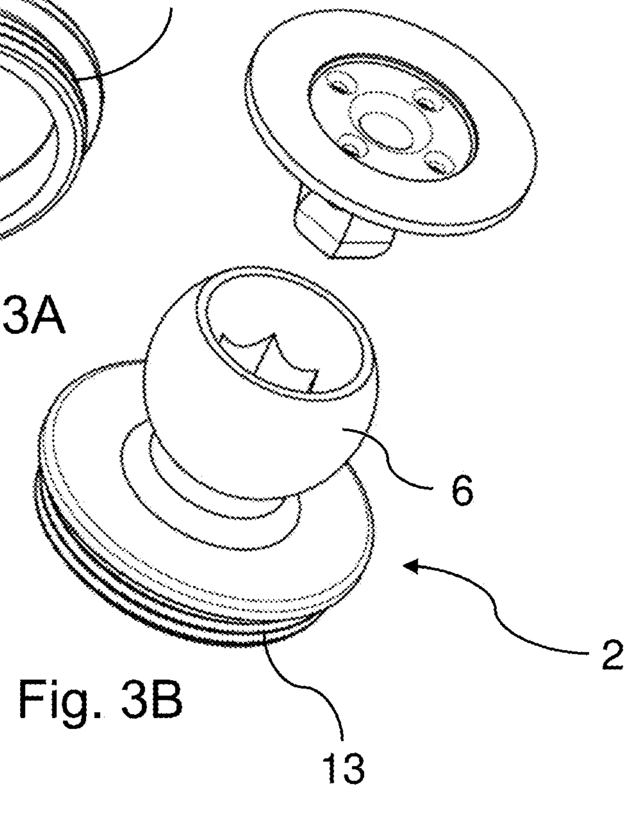
FIG. 3B shows the first joint element and the first swivel head of the first embodiment in a second three-dimensional view.

FIGS. 3A and 3B show the first joint element 2 and the first swivel head 4, attached to the swivel head plate 16, in different three-dimensional views. Identical or similar features are provided with the same reference signs.

Figure 4A:
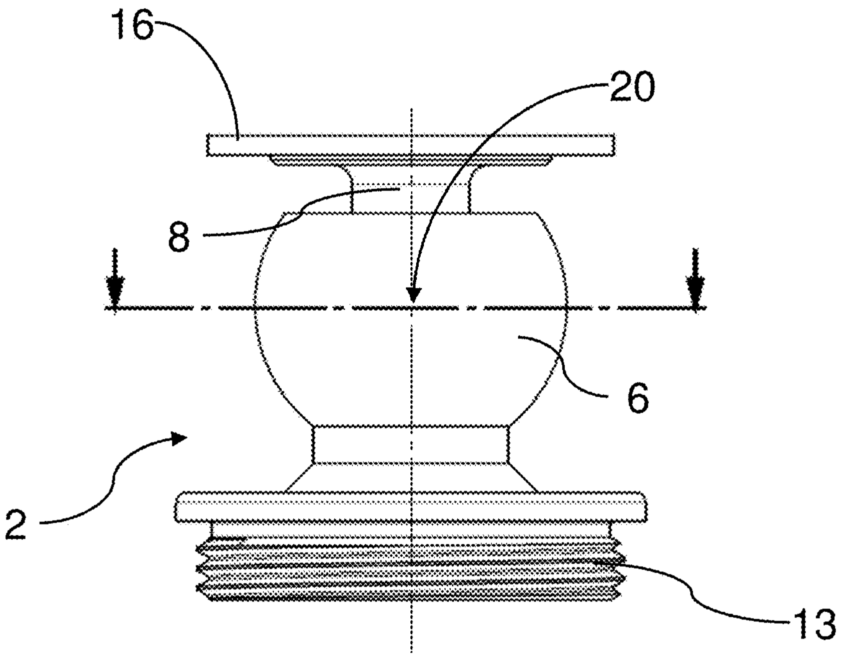
FIG. 4A shows the first swivel head of the first embodiment disposed in the swivel head receptacle, in a lateral view.
Figure 4B:
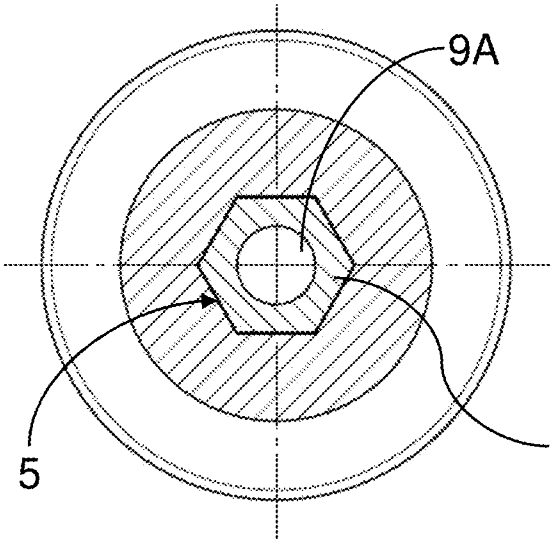
FIG. 4B shows the first swivel head of the first embodiment disposed in the swivel head receptacle, in a first sectional illustration.

FIG. 4A shows the first swivel head 4 attached to the swivel head plate 16 and disposed in the swivel head receptacle 5 of the first joint element 2 in a lateral view. FIG. 4B shows the swivel head 4 illustrated in FIG. 4A and disposed in the swivel head receptacle 5 in a sectional illustration. Identical or similar features are provided with the same reference signs. As is clearly shown in FIG. 4B the swivel head 4 is able to be disposed in a form-fitting manner in the swivel head receptacle 5. In other words: the swivel head 4 can be connected to the first joint element 2 in a form-fitting manner. Yet again in other words: the non-round contour of the swivel head 4 engages in the correspondingly shaped mating contour of the swivel head receptacle 5 so as to co-rotationally connect the swivel head 4 to the first joint element 2. In this manner, the swivel head receptacle 5 and the first swivel head 4 form an anti-twist device.

Figures 5A, 5B, 5C:
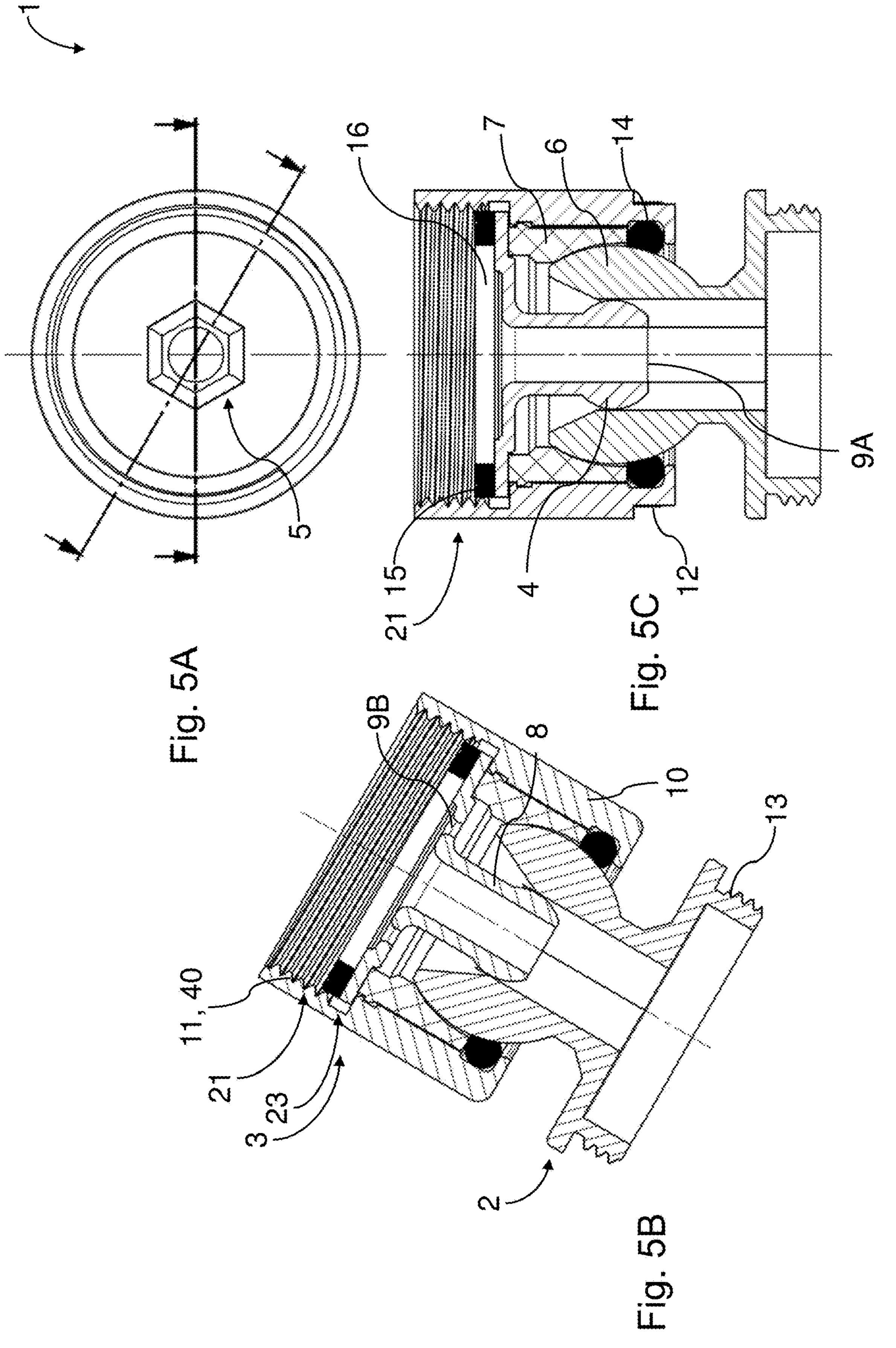
FIG. 5A shows the first swivel head of the first embodiment disposed in the swivel head receptacle, in a view from above.
FIG. 5B shows the first swivel head of the first embodiment disposed in the swivel head receptacle, in a second sectional illustration.
FIG. 5C shows the first swivel head of the first embodiment disposed in the swivel head receptacle, in a third sectional illustration.

FIGS. 5A-C show the joint 1 illustrated in FIG. 2 in the assembled state, in a view from above and in a sectional illustration. Identical or similar features are provided with the same reference signs. The sealing functions of the first and the second sealing ring 14, 15, and the internal thread 11 of the sleeve 10, can be clearly seen in FIGS. 5A-C. The internal thread 11 of the sleeve 10 is comprised by a connecting portion 21 of the sleeve 10.

Figure 6:
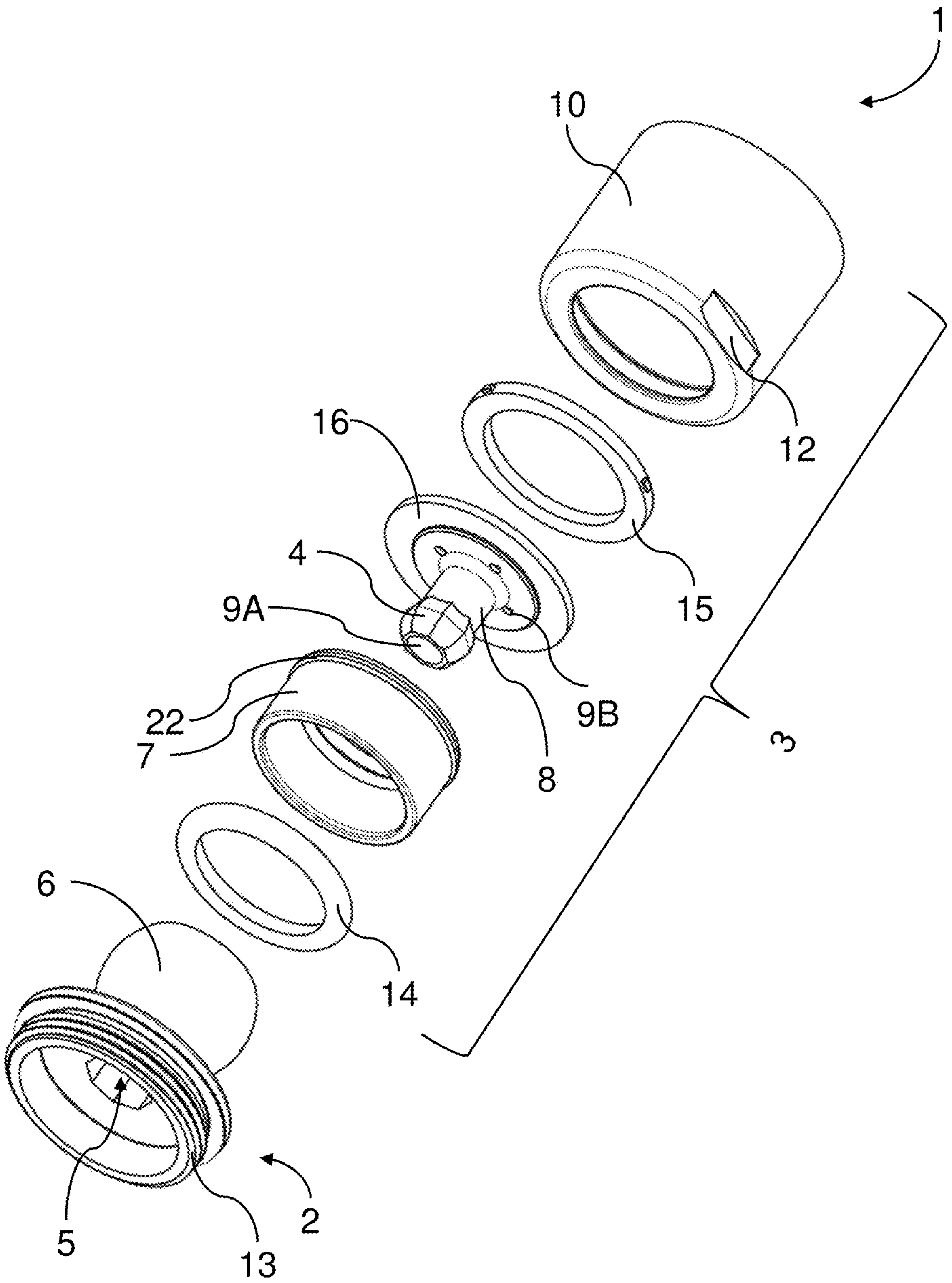
FIG. 6 shows a second embodiment of the joint in an exploded illustration.

FIG. 6 shows a second embodiment of the joint 1 in an exploded illustration. Identical or similar features are provided with the same reference signs. As opposed to the first embodiment of the joint 1, the second embodiment of the joint 1 comprises an octagonal swivel head 4. Providing a larger number of edges on the polygonal swivel head 4 can result in simplified handling when pivoting the first joint element 2 within the second joint element 3 in different directions, i.e. about different directions which are transverse to a longitudinal axis of the fluid line 9, or of the fluid flow. In other words: the pivotability of the joint 1 is improved.

Figure 7:
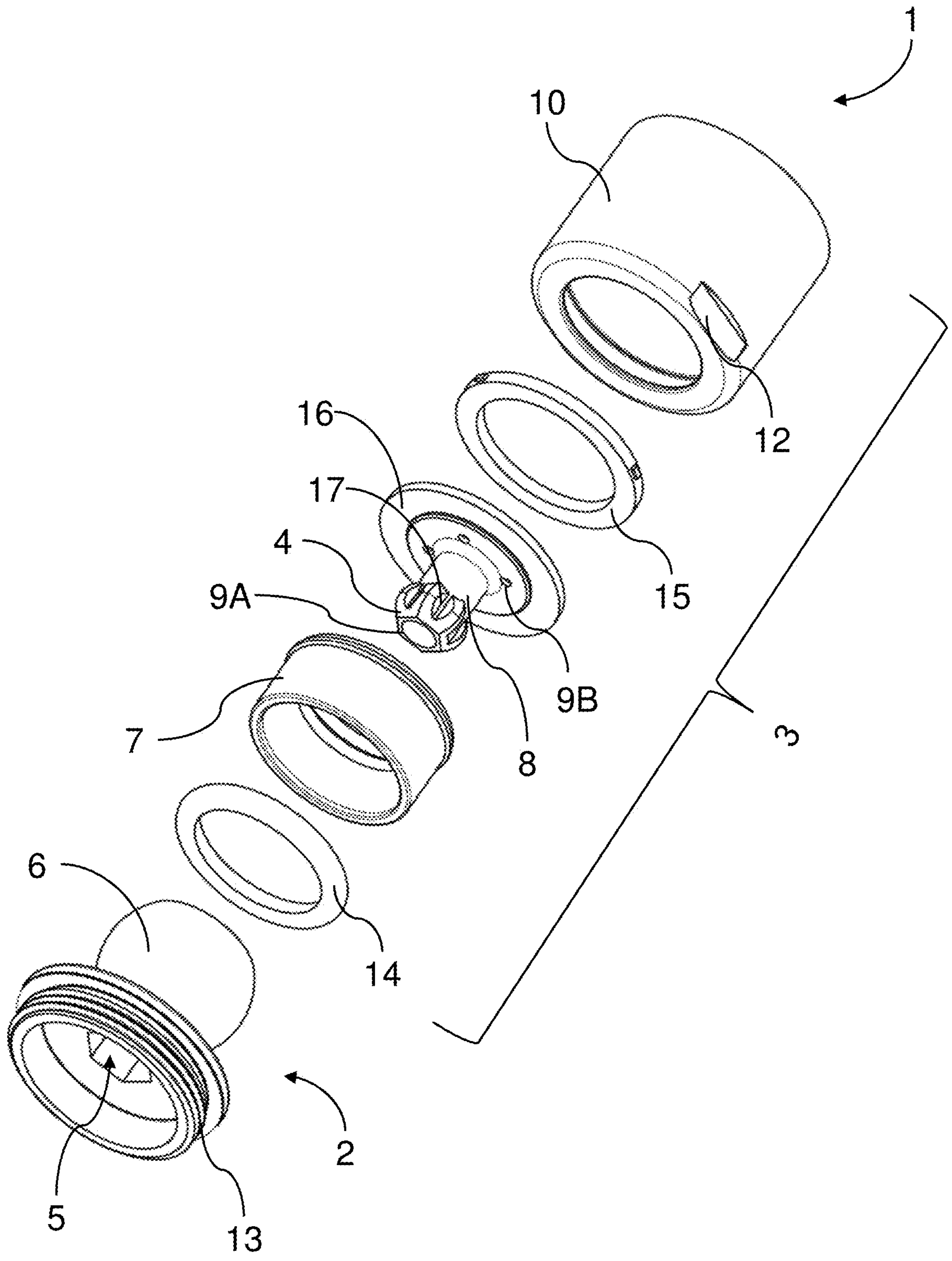
FIG. 7 shows a third embodiment of the joint in an exploded illustration.

FIG. 7 shows a third embodiment of the joint 1 in an exploded illustration. Identical or similar features are provided with the same reference signs. As opposed to the first and the second embodiment of the joint 1, the third embodiment of the joint 1 comprises a plurality of bypass ducts 17. The plurality of bypass ducts 17 are formed as grooves on the first swivel head 4. The bypass ducts 17 are part of the fluid line 9. A fluid flow entering through the second through-bores 9B can be directed into the swivel head receptacle 5 by way of the bypass ducts 17. The overall cross section of the fluid line 9 is enlarged in this way, and the flow rate of the fluid flow through the fluid line 9 is thus increased.

Figure 8A:
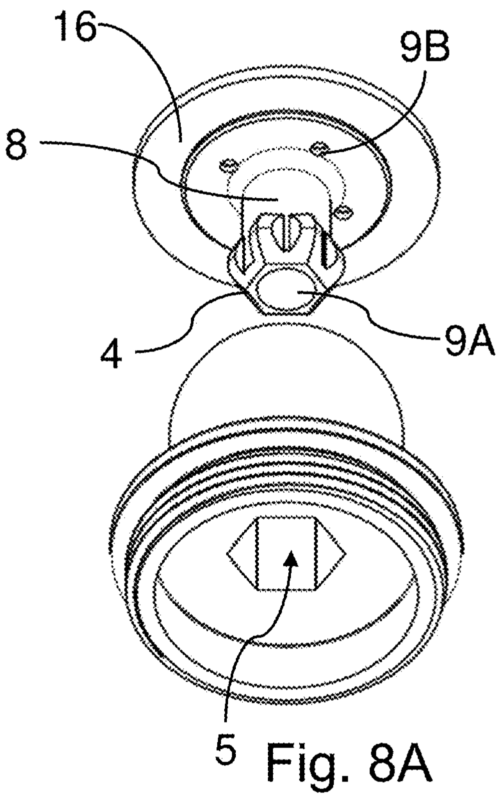
FIG. 8A shows the first joint element and the first swivel head of the third embodiment in a first three-dimensional view.
Figure 8B:
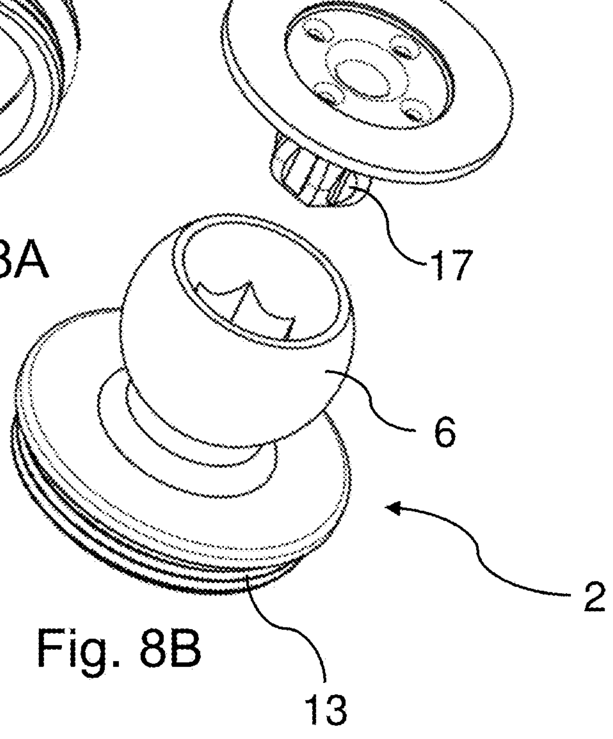
FIG. 8B shows the first joint element and the first swivel head of the third embodiment in a second three-dimensional view.

FIGS. 8A and 8B show the first joint element 2 and the first swivel head 4, attached to the swivel head plate 16, of the third embodiment in different three-dimensional views. Identical or similar features are provided with the same reference signs.

Figure 9A:
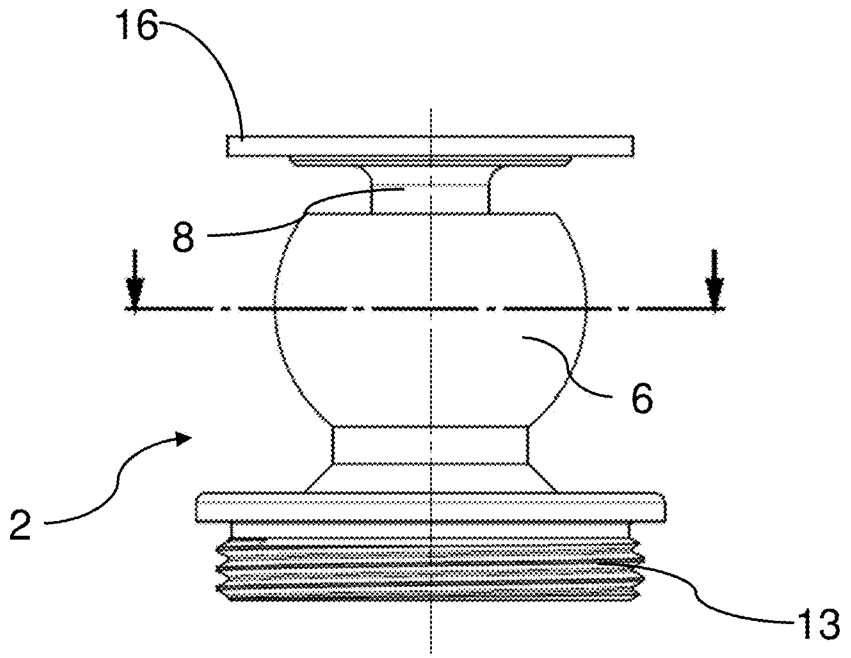
FIG. 9A shows the first swivel head of the third embodiment disposed in the swivel head receptacle, in a lateral view.
Figure 9B:
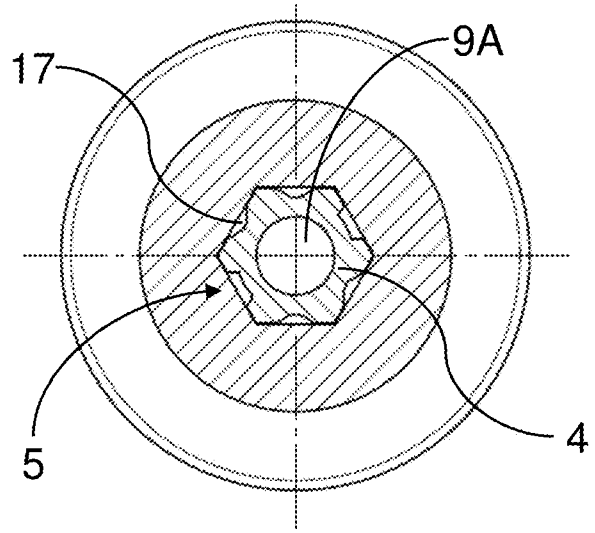
FIG. 9B shows the first swivel head of the third embodiment disposed in the swivel head receptacle, in a sectional illustration.
Figure 10:
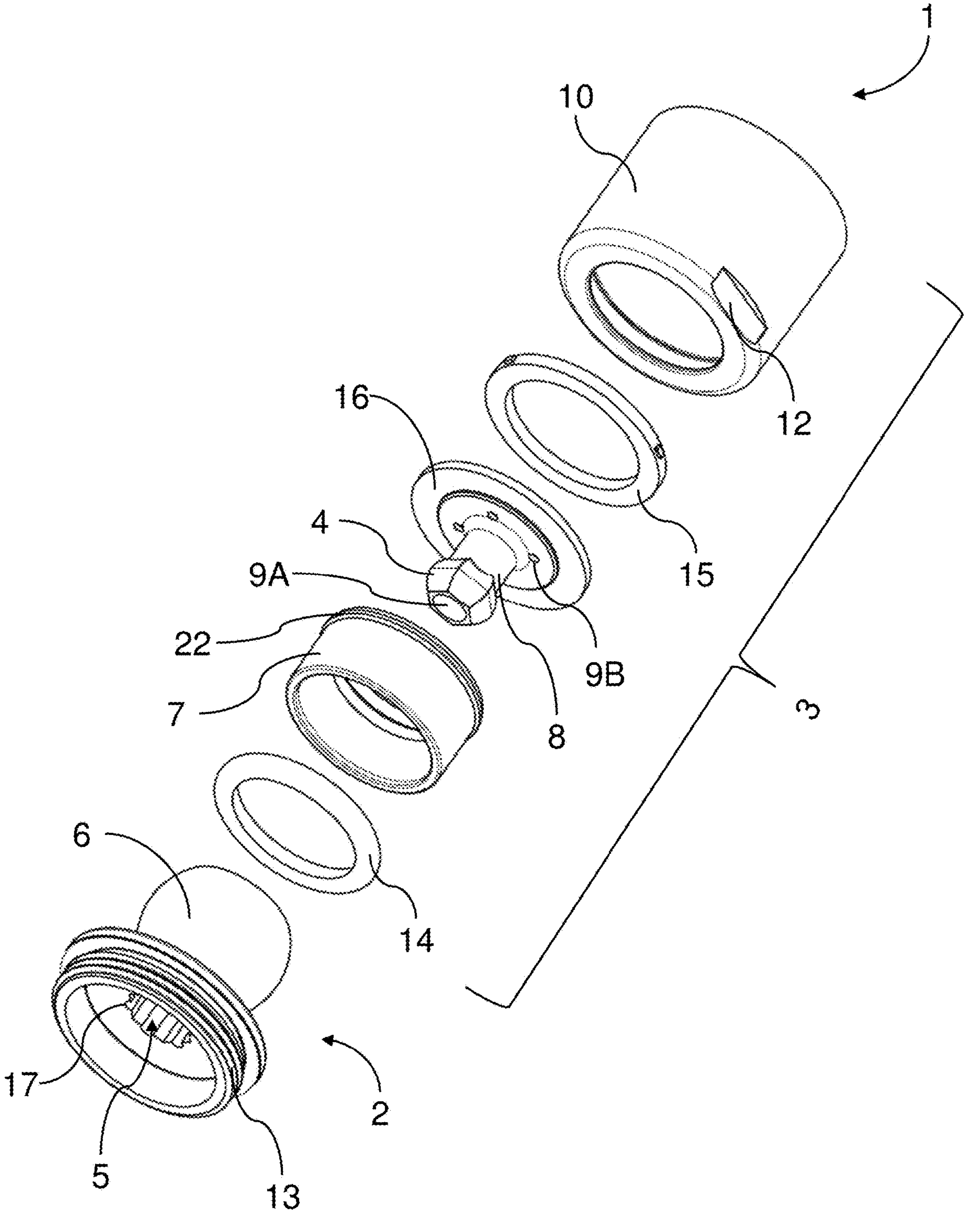
FIG. 10 shows a fourth embodiment of the joint in an exploded illustration.
Figure 11A:
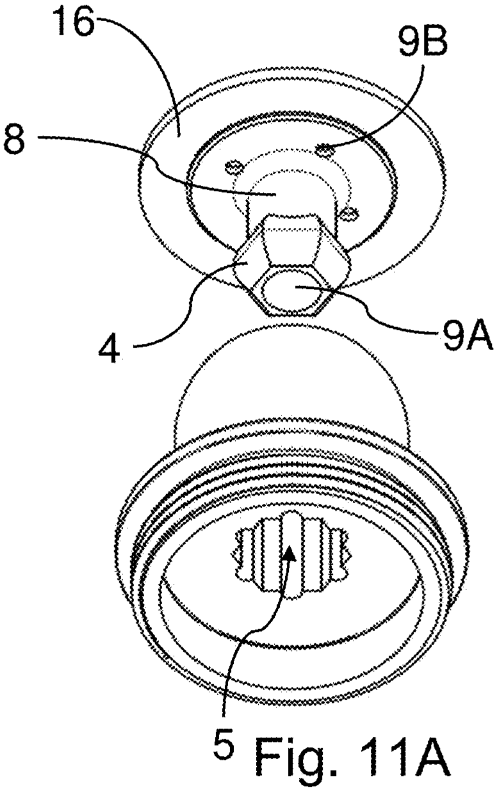
FIG. 11A shows the first joint element and the first swivel head of the fourth embodiment in a first three-dimensional view.
Figure 11B:
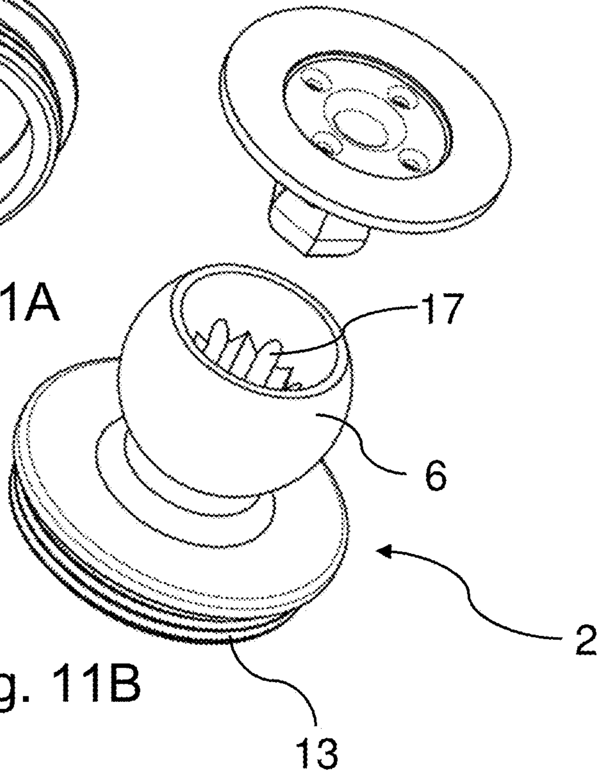
FIG. 11B shows the first joint element and the first swivel head of the fourth embodiment in a second three-dimensional view.
Figure 12A:
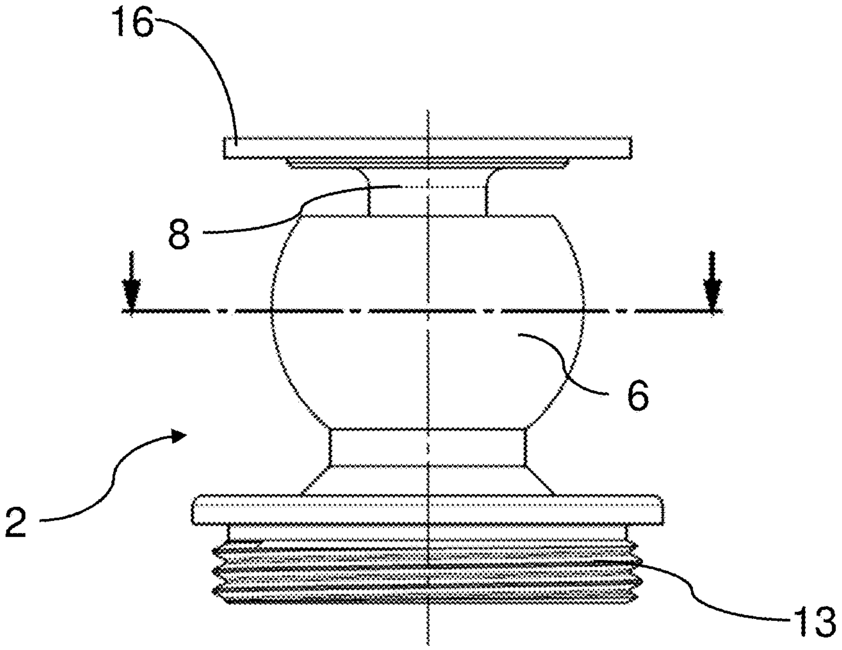
FIG. 12A shows the first swivel head of the fourth embodiment disposed in the swivel head receptacle, in a lateral view.
Figure 12B:
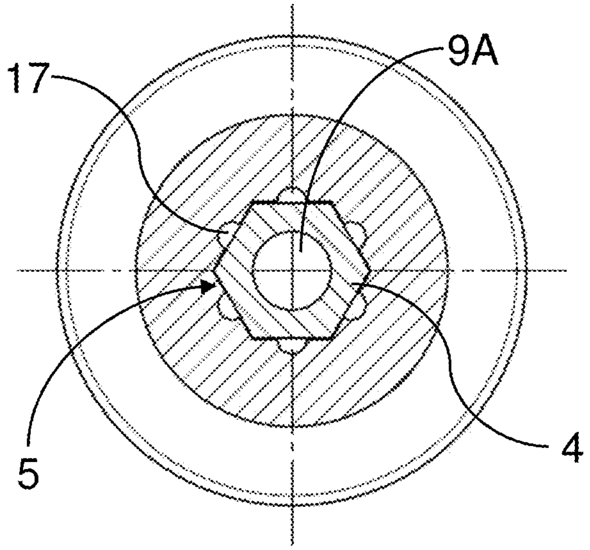
FIG. 12B shows the first swivel head of the fourth embodiment disposed in the swivel head receptacle, in a first sectional illustration.

FIG. 9A shows the first swivel head 4, attached to the swivel head plate 16 and disposed in the swivel head receptacle 5 of the first joint element 2, of the third embodiment in a lateral view. FIG. 9B shows the swivel head 4 illustrated in FIG. 9A and disposed in the swivel head receptacle 5 in a sectional illustration. Identical or similar features are provided with the same reference signs. As can be clearly seen in FIG. 9B, the bypass ducts 17 enable a fluid flow between an external surface of the first swivel head 4 and an internal surface of the swivel head receptacle 5. The non-round contour of the swivel head 4 and the correspondingly shaped mating contour of the receptacle 5 form an at least partially form-fitting connection, i.e. an anti-twist device, even in the case of the intermediate spaces provided.

FIGS. 10 to 12 and 22 show a fourth embodiment of the joint 1. Identical or similar features are provided with the same reference signs. As can be clearly seen in FIGS. 10 to 12, the bypass ducts 17, which have been described in the context of the third embodiment, are not formed on the first swivel head 4 but on the swivel head receptacle 5. In other words: the surface of the swivel head receptacle 5 has bypass ducts 17 in the form of cutouts or grooves, which permit a fluid flow between the surface of the swivel head receptacle 5 and the surface of the first swivel head 4. Alternatively, bypass ducts 17 can be formed on the first swivel head 4 as well as on the swivel head receptacle 5.

Figure 13:
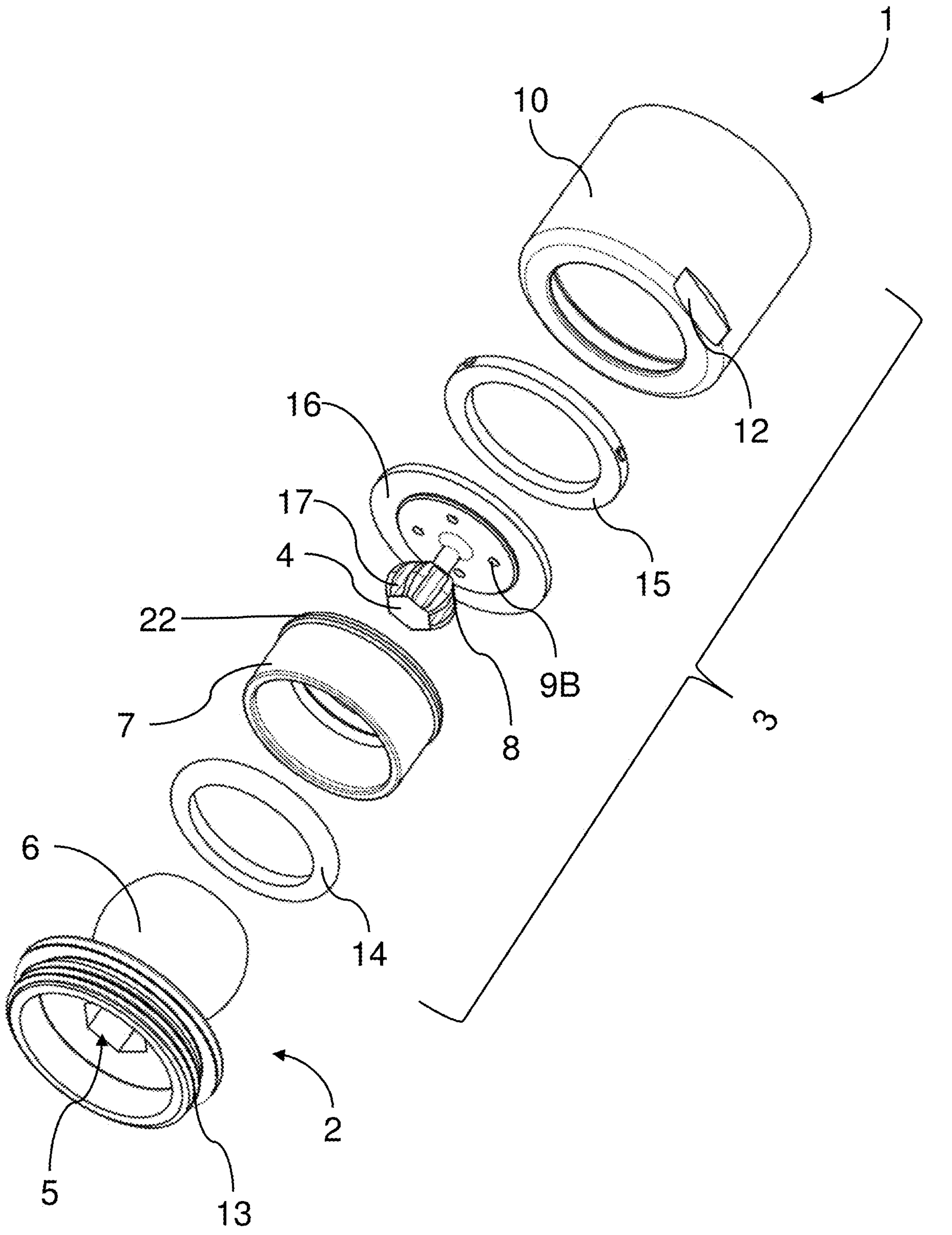
FIG. 13 shows a fifth embodiment of the joint in an exploded view.
Figure 14A:
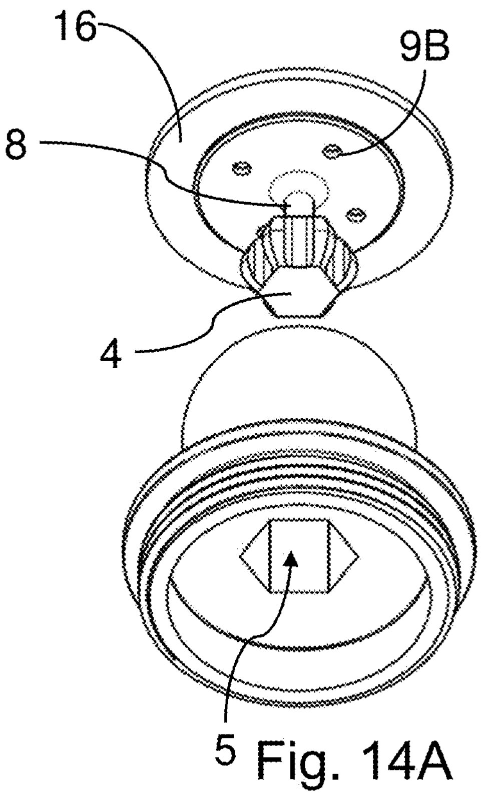
FIG. 14A shows the first joint element and the first swivel head of the fifth embodiment in a first three-dimensional view.
Figure 14B:
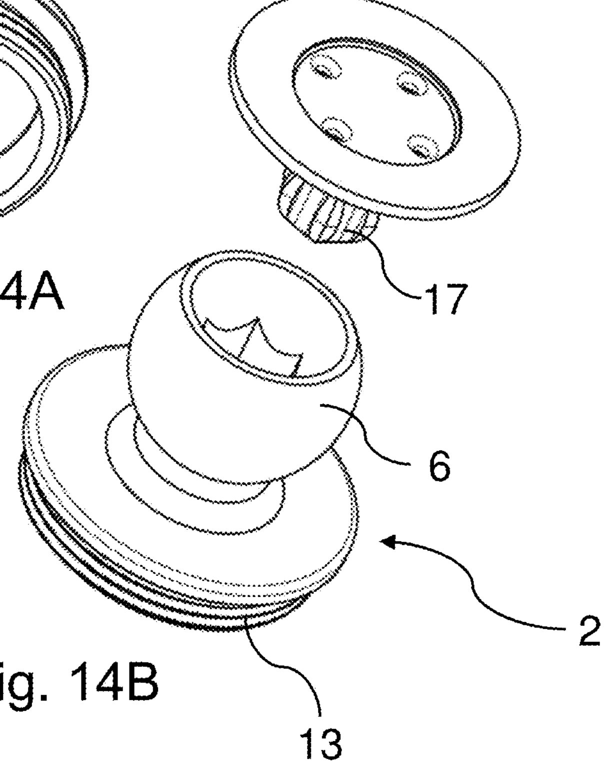
FIG. 14B shows the first joint element and the first swivel head of the fifth embodiment in a second three-dimensional view.
Figure 15A:
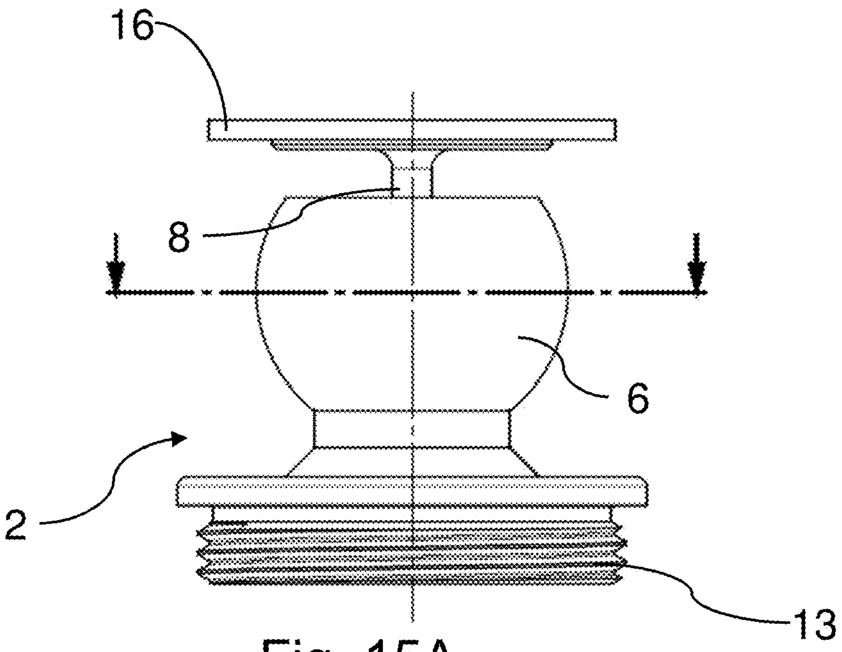
FIG. 15A shows the first swivel head of the fifth embodiment disposed in the swivel head receptacle, in a lateral view.
Figure 15B:
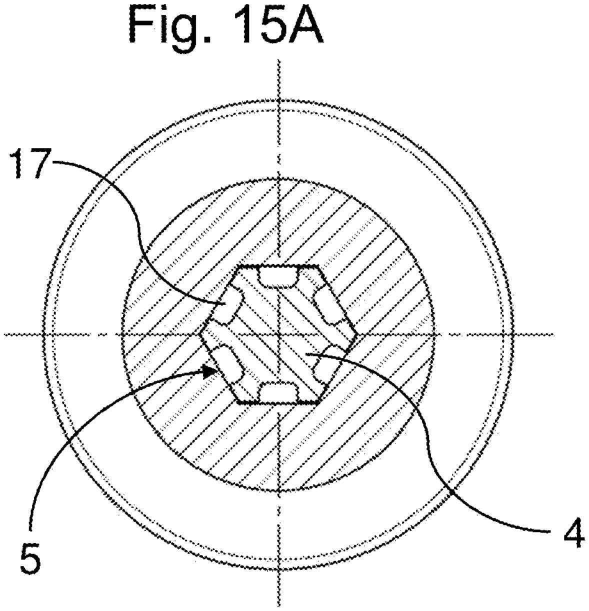
FIG. 15B shows the first swivel head of the fifth embodiment disposed in the swivel head receptacle, in a first sectional illustration.
Figures 16A, 16B, 16C:
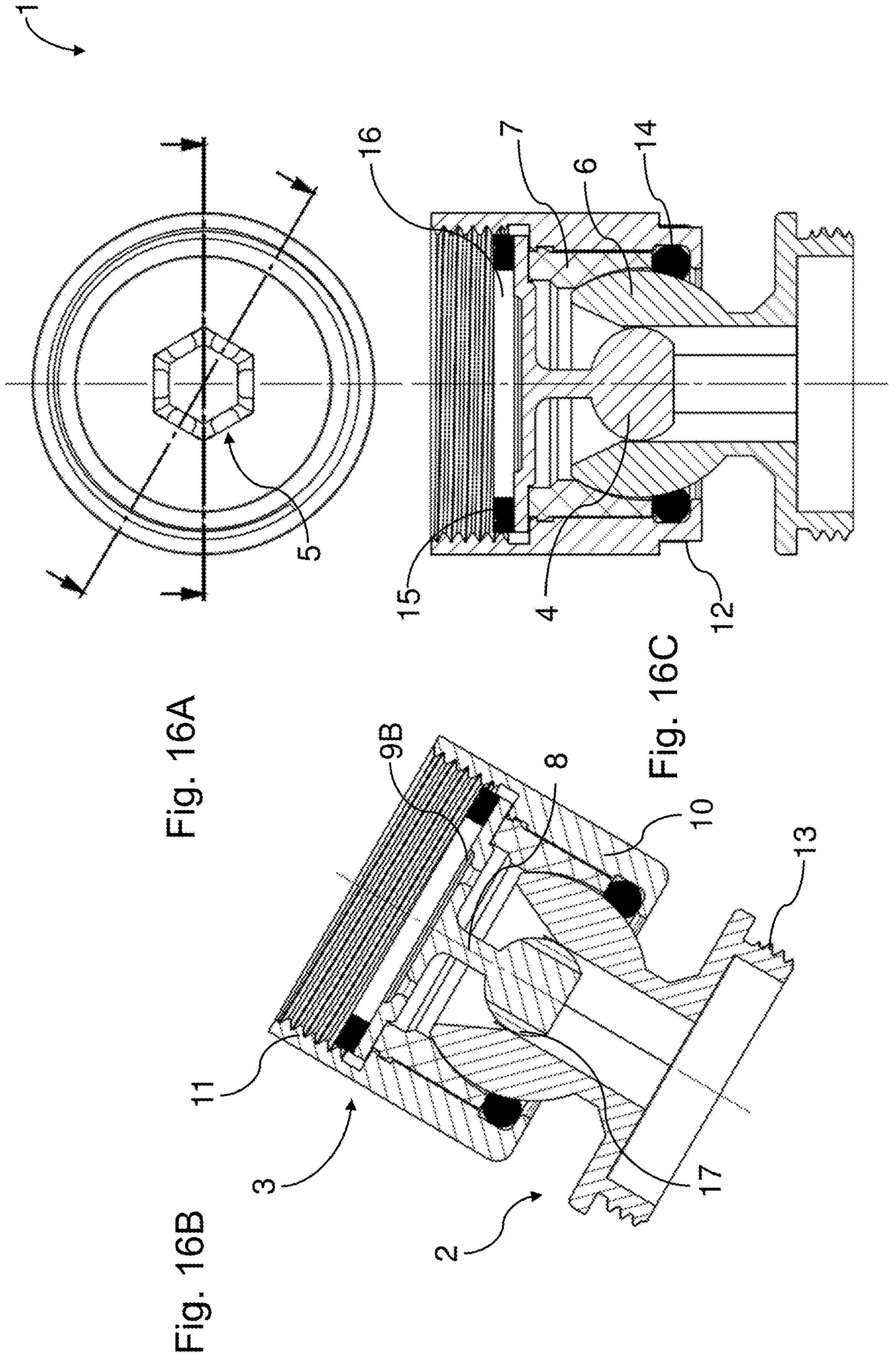
FIG. 16A shows the first swivel head of the fifth embodiment disposed in the swivel head receptacle, in a view from above.
FIG. 16B shows the first swivel head of the fifth embodiment disposed in the swivel head receptacle, in a second sectional illustration.
FIG. 16C shows the first swivel head of the fifth embodiment disposed in the swivel head receptacle, in a third sectional illustration.
Figure 17:
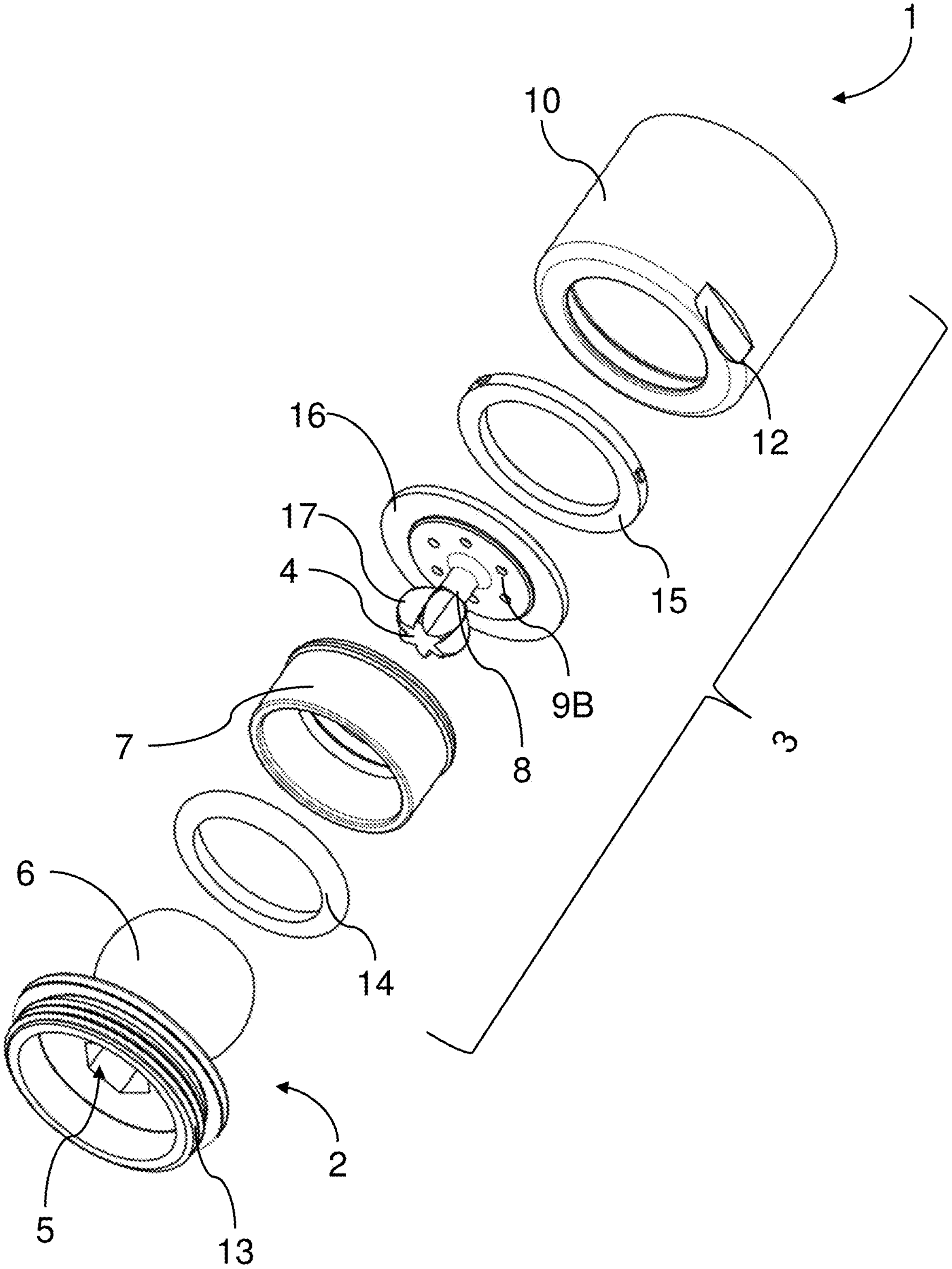
FIG. 17 shows a sixth embodiment of the joint in an exploded illustration.
Figure 18A:
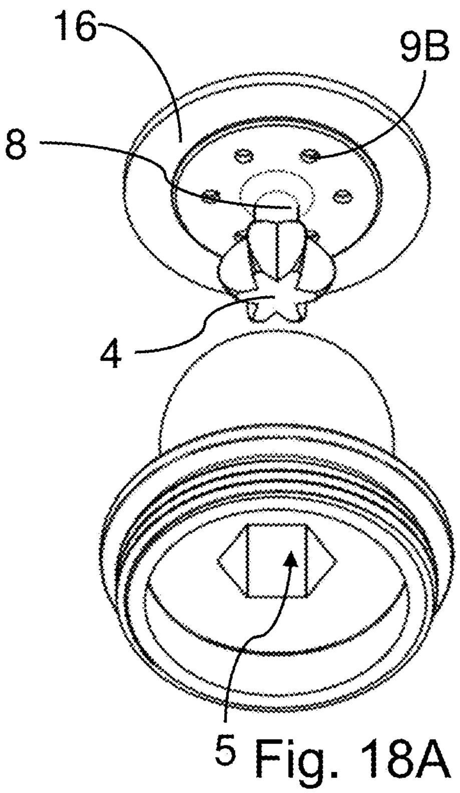
FIG. 18A shows the first joint element and the first swivel head of the sixth embodiment in a first three-dimensional view.
Figure 18B:
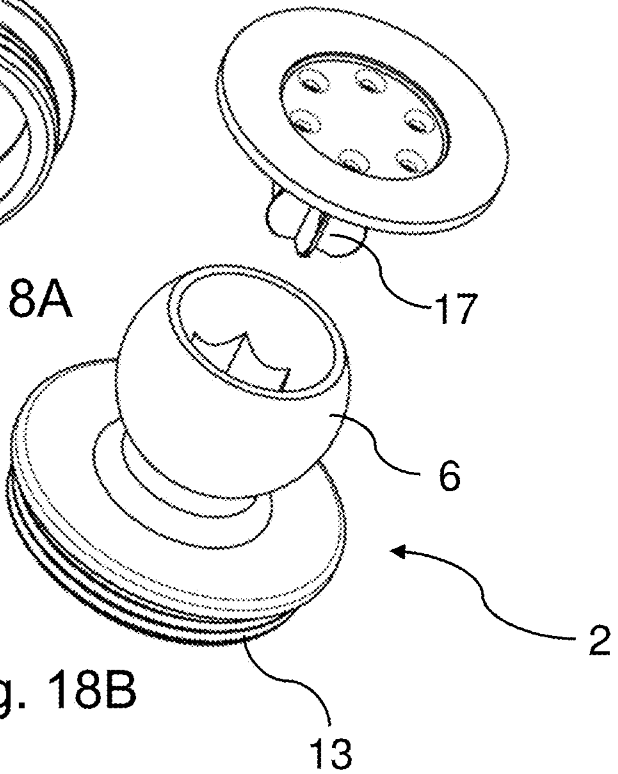
FIG. 18B shows the first joint element and the first swivel head of the sixth embodiment in a second three-dimensional view.
Figure 19A:
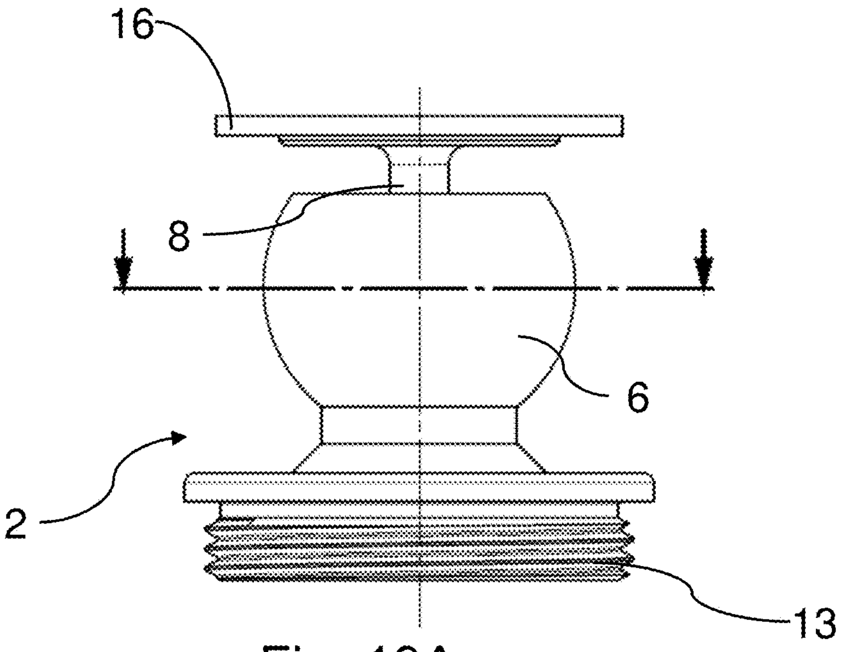
FIG. 19A shows the first swivel head of the sixth embodiment disposed in the swivel head receptacle, in a lateral view.
Figure 19B:
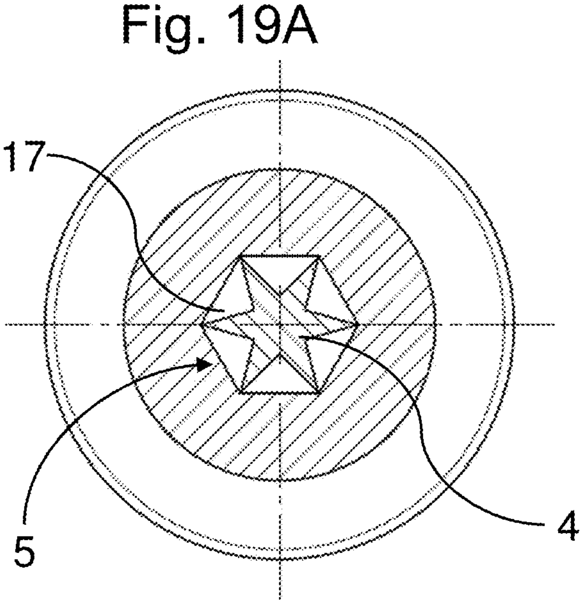
FIG. 19B shows the first swivel head of the sixth embodiment disposed in the swivel head receptacle, in a first sectional view.
Figure 20A:
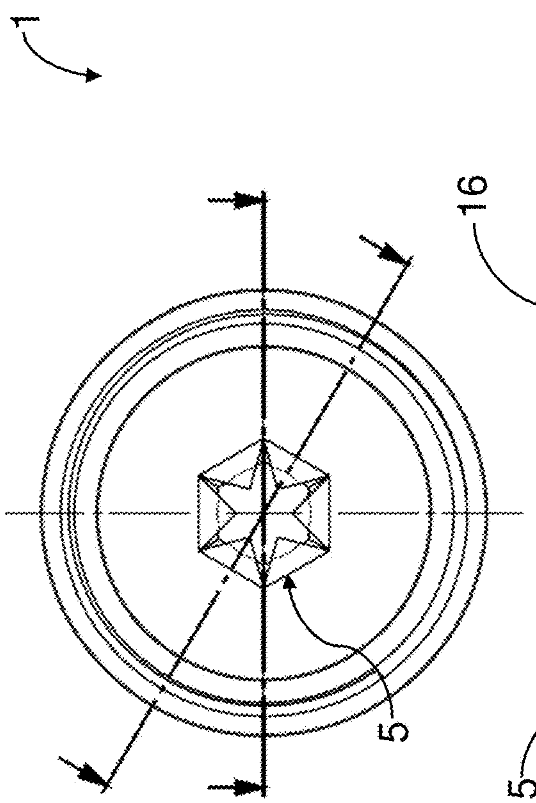
FIG. 20A shows the first swivel head of the sixth embodiment disposed in the swivel head receptacle, in a view from above.
Figure 20C:
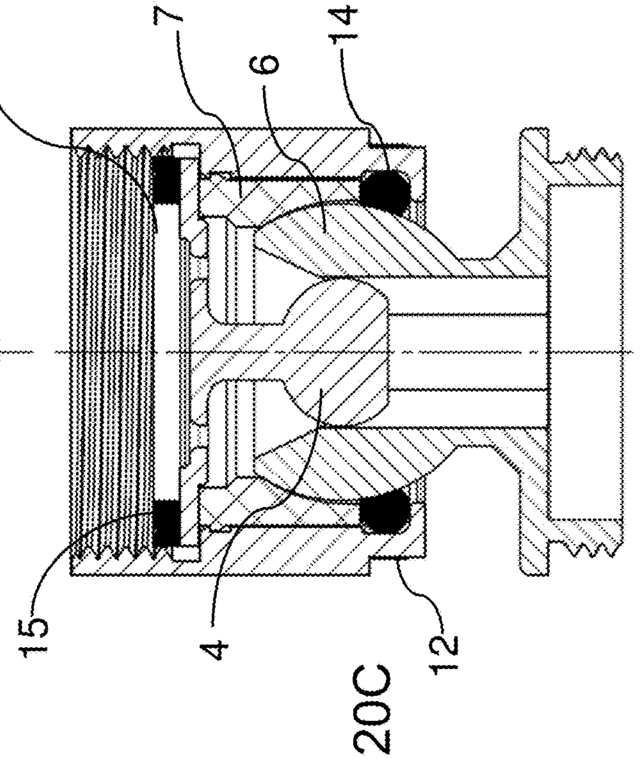
FIG. 20C shows the first swivel head of the sixth embodiment disposed in the swivel head receptacle, in a third sectional illustration.
Figure 20B:
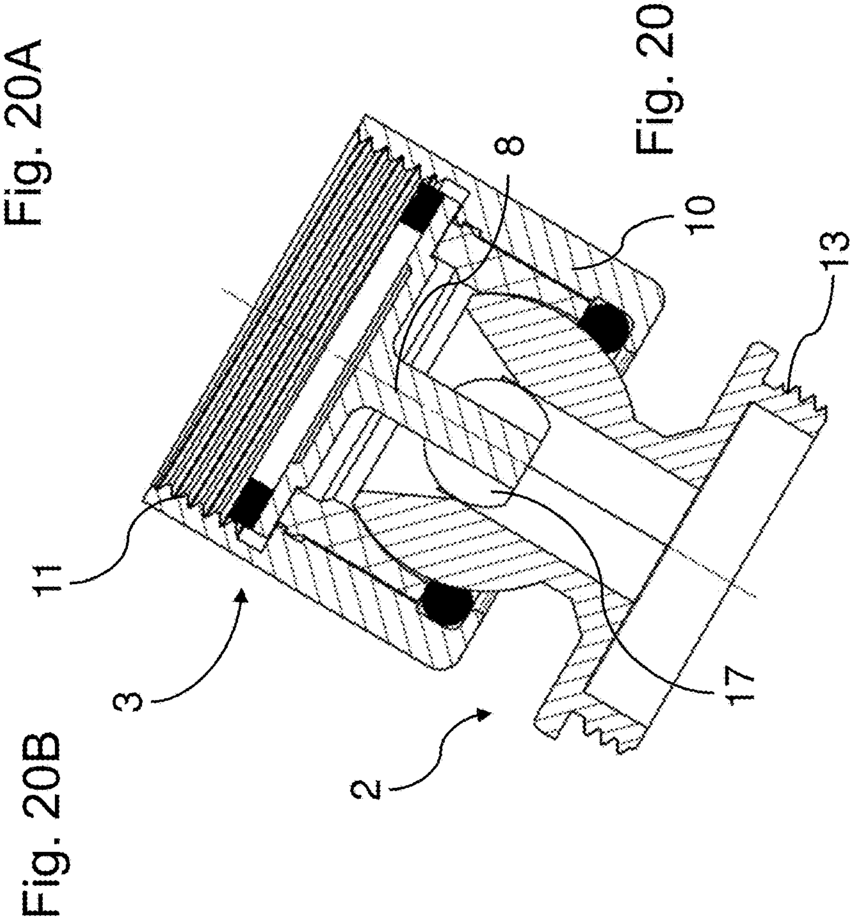
FIG. 20B shows the first swivel head of the sixth embodiment disposed in the swivel head receptacle, in a second sectional illustration.

FIG. 13 shows a fifth embodiment of the joint 1 in an exploded illustration. Identical or similar features are provided with the same reference signs. As opposed to the embodiments of the joint 1 described above, the joint 1 of the fifth embodiment has a pin-type swivel head neck 8 without through-bores. In other words: the swivel head neck 8 is designed as a pin.

As is clearly illustrated in FIGS. 13 to 16, the first swivel head 4 comprises grooves as bypass ducts 17. As in the third embodiment described, the joint 1 of the fifth embodiment comprises a hexagonal first swivel head 4. In other words: a base area of the first swivel head is designed to be polygonal, presently hexagonal. The grooves or bypass ducts 17 are designed on the lateral surfaces of the polygonal first swivel head 4.

The bypass ducts 17 are larger in comparison to the bypass ducts 17 described in the context of the first to fourth embodiments, i.e. designed with a larger duct cross section. The swivel head neck 8, designed as a pin, by virtue of its relatively thin cross section permits a relatively large pivot angle of the first joint element 2 within the second joint element 3.

FIGS. 17 to 20 show a sixth embodiment of the joint 1. Identical or similar features are provided with the same reference signs. As in the fifth embodiment of the joint 1 described, the swivel head neck 8 of the six embodiment of the joint 1 is likewise designed as a pin. The first swivel head 4 is of a star-shaped design. In other words: the first swivel head 4 has a star-shaped base area. The bypass ducts 17 which are formed on the first swivel head 4 form in each case a cavity in the form of a triangular prism. The first swivel head 4 converges in a tip between the bypass ducts 17. The swivel head neck 8 and the first swivel head 4 are of a solid design. In other words: the swivel head neck 8 and the first swivel head 4 are designed without a through-bore.

Figure 21:
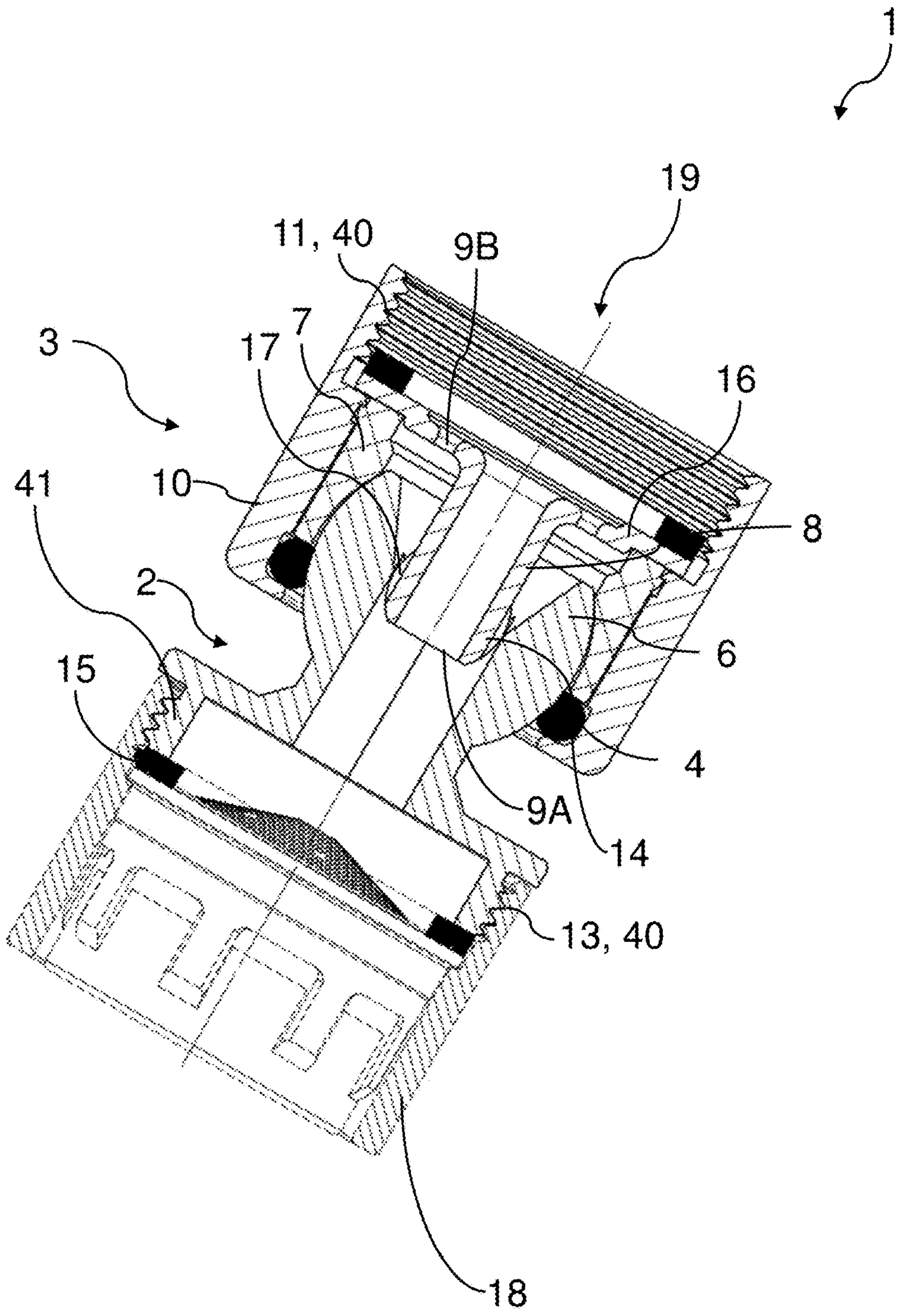
FIG. 21 shows the third embodiment of the joint in the assembled state, in a sectional illustration.

FIG. 21 shows a sectional illustration of the third embodiment of the joint 1 in the assembled state. Identical or similar features are provided with the same reference signs. As can be clearly seen in the example illustrated, a jet regulator 18 can be attached to the first joint element 2, presently by means of the external thread 13 of the first joint element 2. The jet regulator 18 can be an adjustable or switchable jet regulator 18. For example, the jet regulator 18 can be switched by means of a, particularly manual, rotating part of the jet regulator. The rotation can represent a rotation about the longitudinal axis 19 of the joint 1.

Figure 22A:
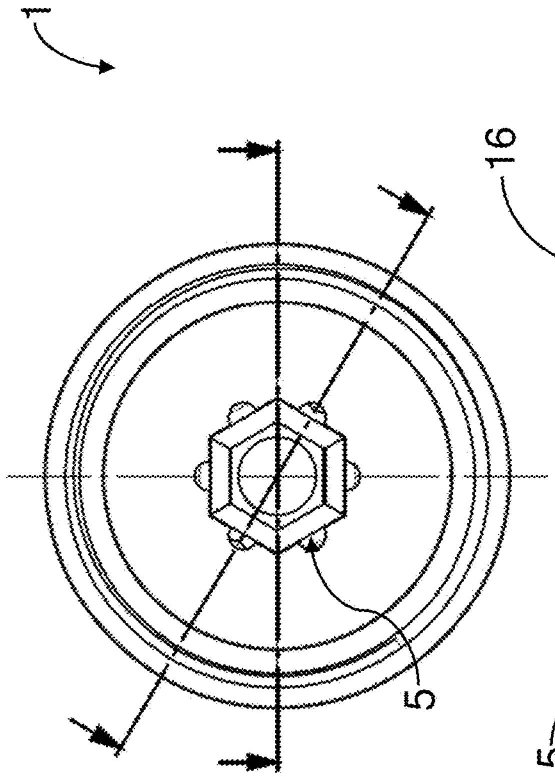
FIG. 22A shows the first swivel head of the fourth embodiment disposed in the swivel head receptacle, in a view from above.
Figure 22C:
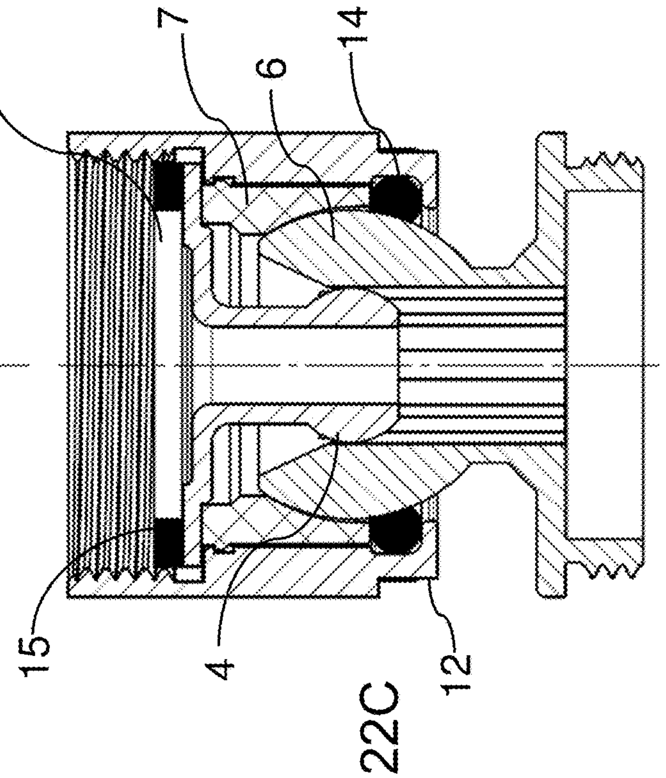
FIG. 22C shows the first swivel head of the fourth embodiment disposed in the swivel head receptacle, in a third sectional illustration.
Figure 22B:
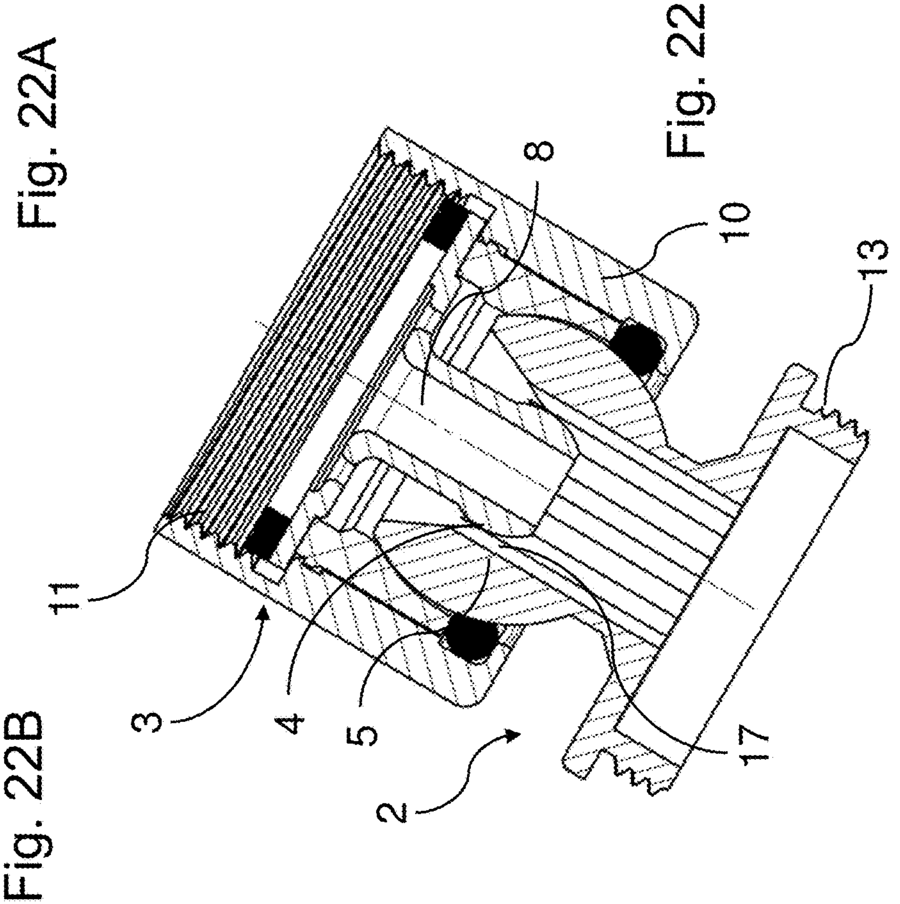
FIG. 22B shows the first swivel head of the fourth embodiment disposed in the swivel head receptacle, in a second sectional illustration.

The illustration according to FIG. 22 shows the configuration of the bypass ducts 17 on the first swivel head 4, or between the latter and swivel head receptacle 5, by way of differently positioned axial sections, the sections along the longitudinal axis 19 of the joint 1.

Figure 23:
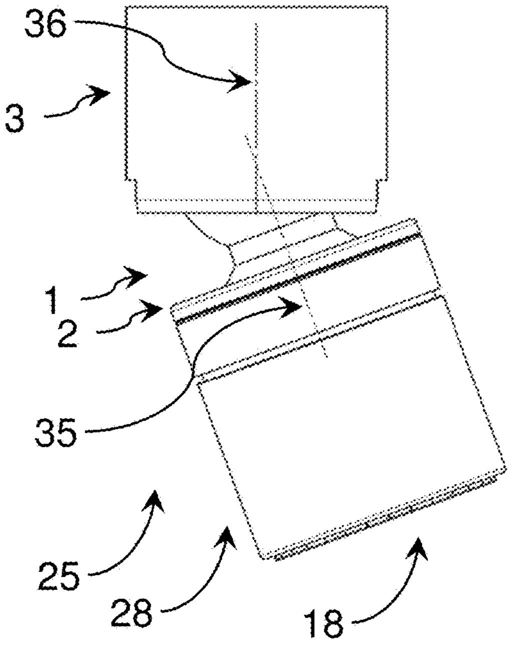
FIG. 23 shows a use of a further embodiment of the joint in an angular position, in a view from the side.

FIG. 23 shows an exemplary use of a joint 1 according to the invention. The first joint element 2 is screwed to a changeover device 28 which may have a jet regulator 18 in the interior. Changing between at least two jet patterns can take place by rotating the changeover device 28 about the longitudinal axis 19 (the latter being angular by way of example).

The anti-twist device has the effect that the first joint element 2 cannot conjointly rotate in the process, but remains co-rotational in relation to the second joint element 3.

Figure 24:
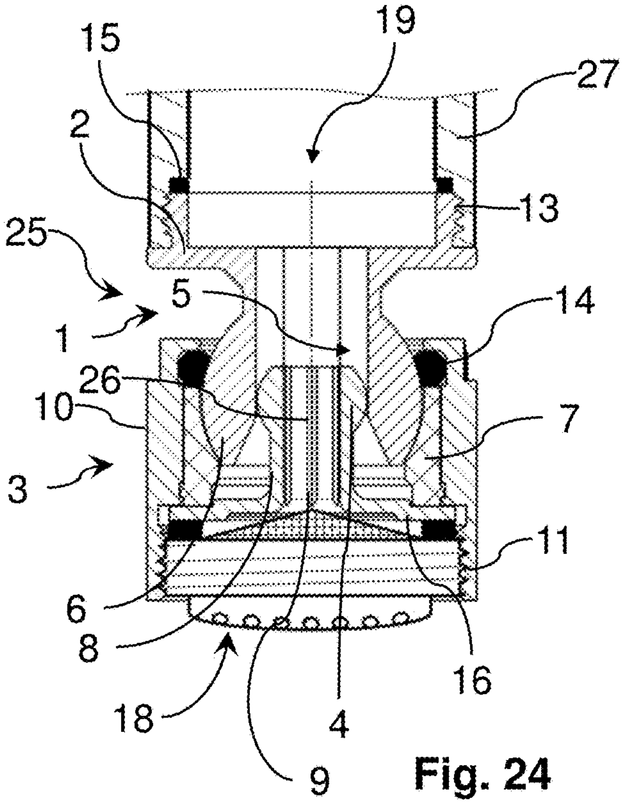
FIG. 24 shows the use of the embodiment according to FIG. 23 in a prolate arrangement, in an axial section.
Figure 25:
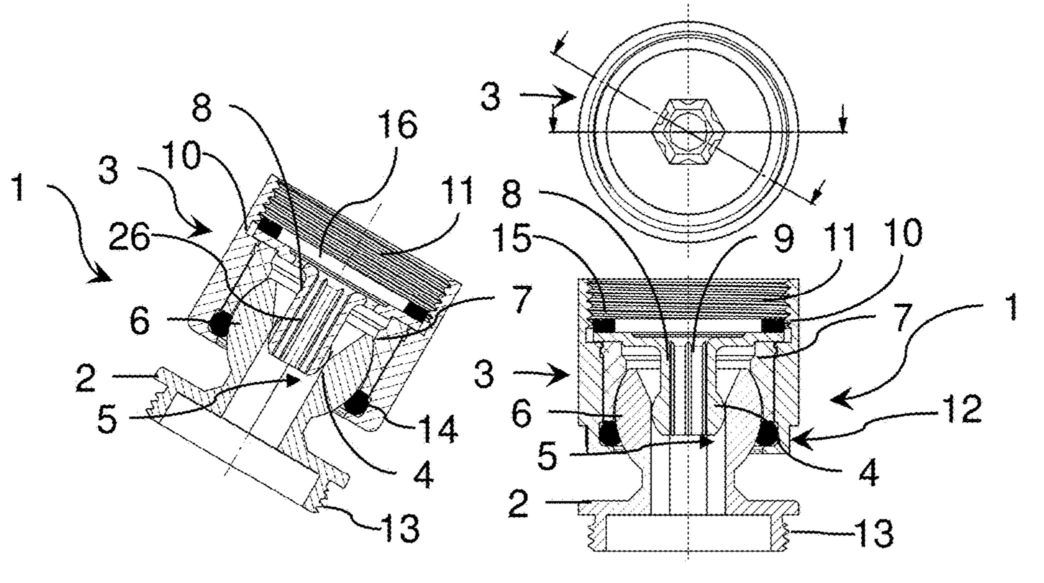
FIG. 25 shows the embodiment according to FIG. 23 without the screwed-in jet regulator, in a first axial section (bottom left), a second axial section (bottom right), and in a frontal view for highlighting the position of the axial sections.

FIGS. 24 and 25 show a further exemplary embodiment according to the invention.

A jet regulator 18 is inserted into the second joint element 3, and therein into the sleeve 10, in order to form a sanitary assembly 25.

In comparison to FIG. 23, the construction is exactly reversed.

A further point of differentiation in comparison to the preceding exemplary embodiments is a tool engagement surface 26 which is formed in the interior of the first swivel head 4, by way of example as an internal hexagon.

Figure 26:
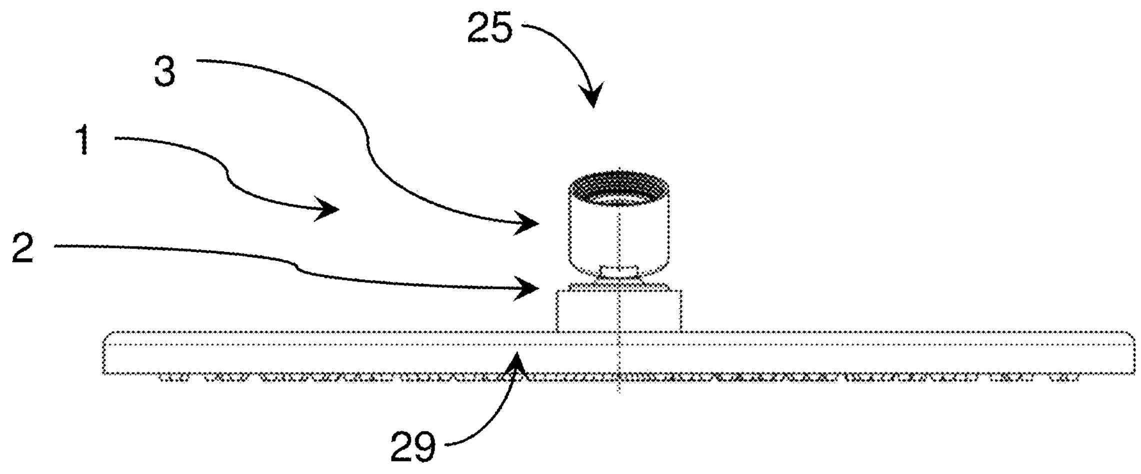
FIG. 26 shows a further use of a joint according to the invention, in a view from the side.
Figure 27:
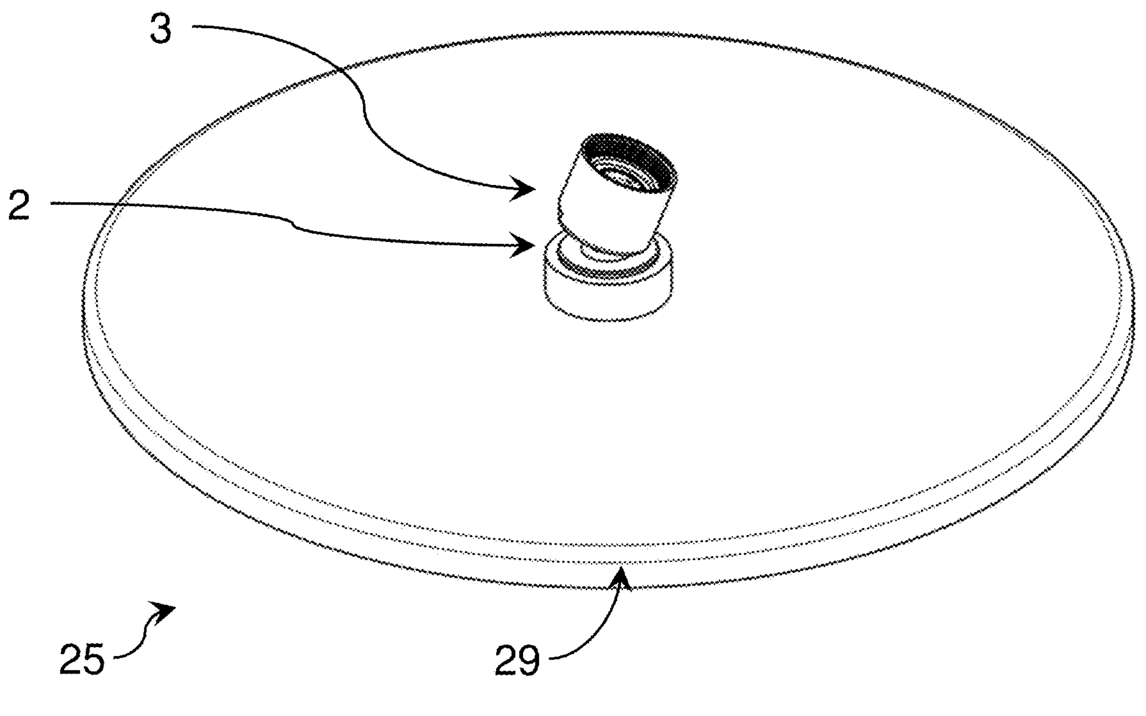
FIG. 27 shows the use from FIG. 26 in a three-dimensional oblique view from above.

FIGS. 26 and 27 show an advantageous type of application.

Illustrated is a shower head 29, or overhead shower, for overhead assembly. Often only a minor spacing of the shower head from a room ceiling remains here, so that the joint 1 with its threads is difficult to access. The use of tools is also difficult due to the overhead assembly, because the working position cannot be directly seen, that is obscured by the shower head 29.

The joint according to the invention now offers the possibility to carry out the screw-fitting by rotating the showerhead.

Figure 28:
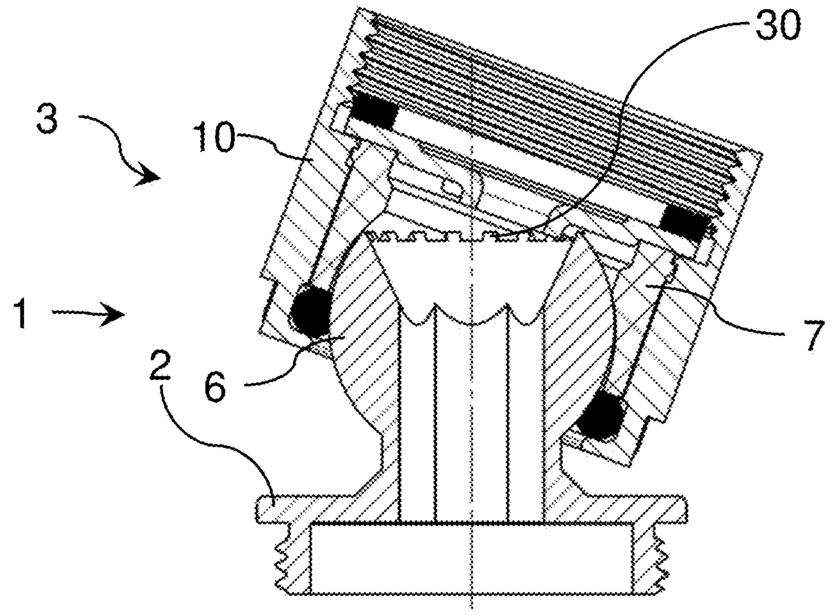
FIG. 28 shows a further embodiment of the invention in an axial section.
Figure 29:
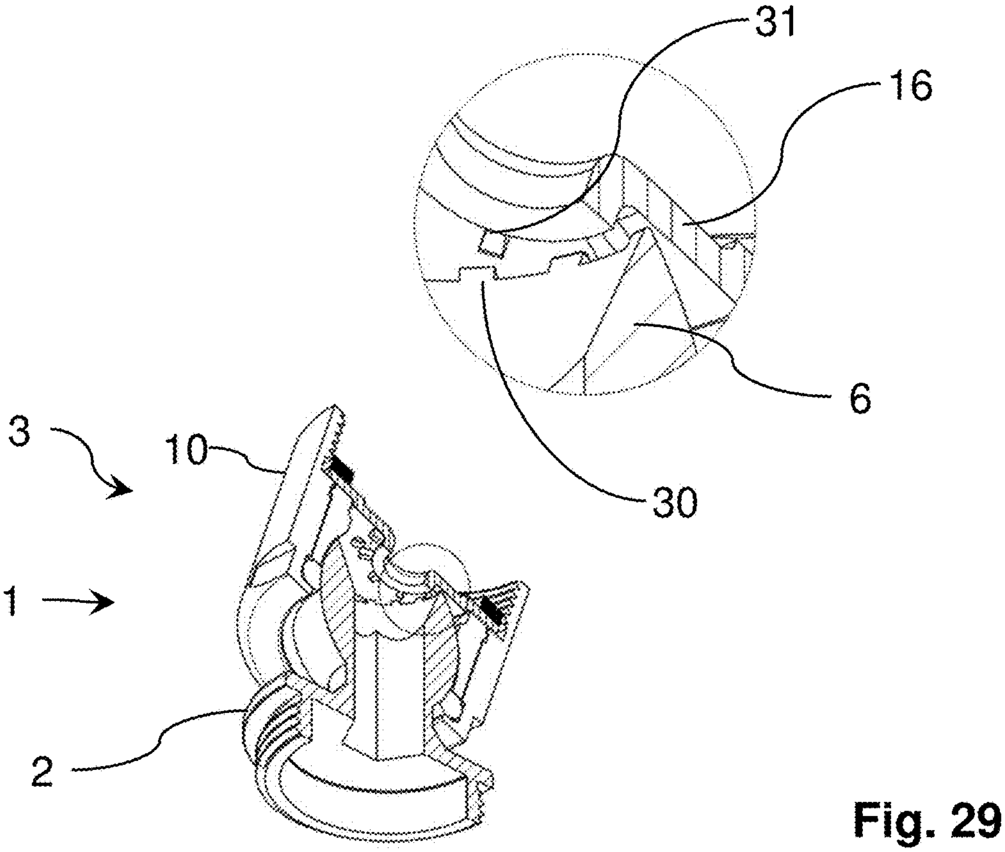
FIG. 29 shows the embodiment according to FIG. 28 in a three-dimensional sectional view (bottom left) and in an enlargement of detail (top right)

The exemplary embodiment according to FIGS. 28 and 29 does not have a first swivel head 4. Instead, a form-fit for transmitting torque here is caused by protrusions 30 which engage in matching cutouts 31 (only) when the shower head 29 is in an oblique position. In this way, a co-rotational coupling of the joint elements 2, 3 to one another is only provided in the angular state, and rotation about the longitudinal axis 19 of the prolate joint 1 is not prevented. Instead, only a rotation about the longitudinal axis 35 on the first joint element 2 and/or about the longitudinal axis 36 on the second joint element 3 is able to be prevented in the case of an angular joint 1.

Figure 30:
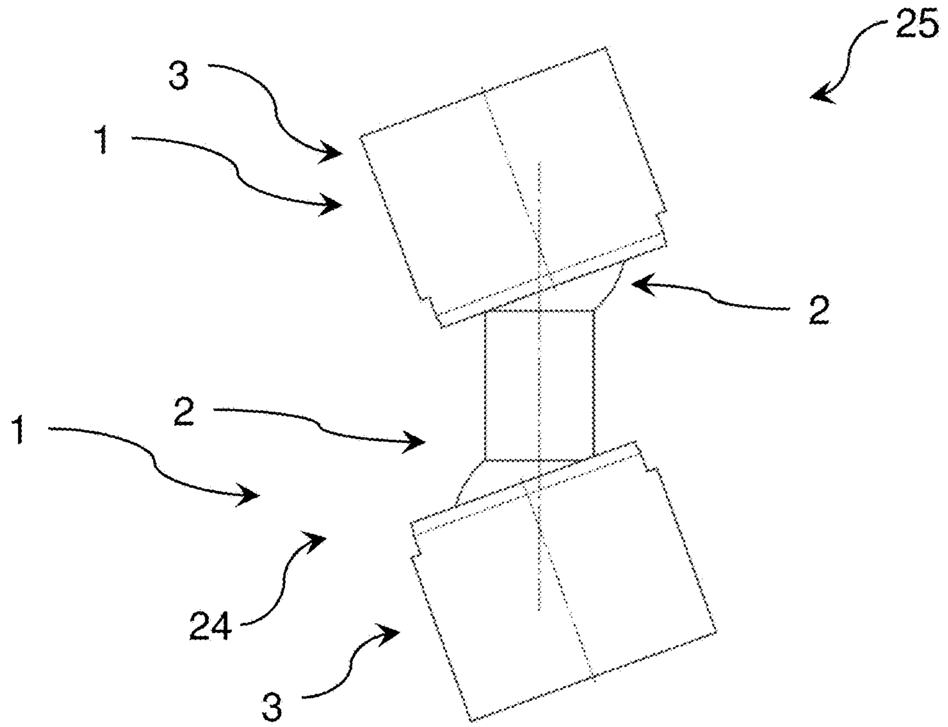
FIG. 30 shows a further embodiment according to the invention in a view from the side.
Figure 31:
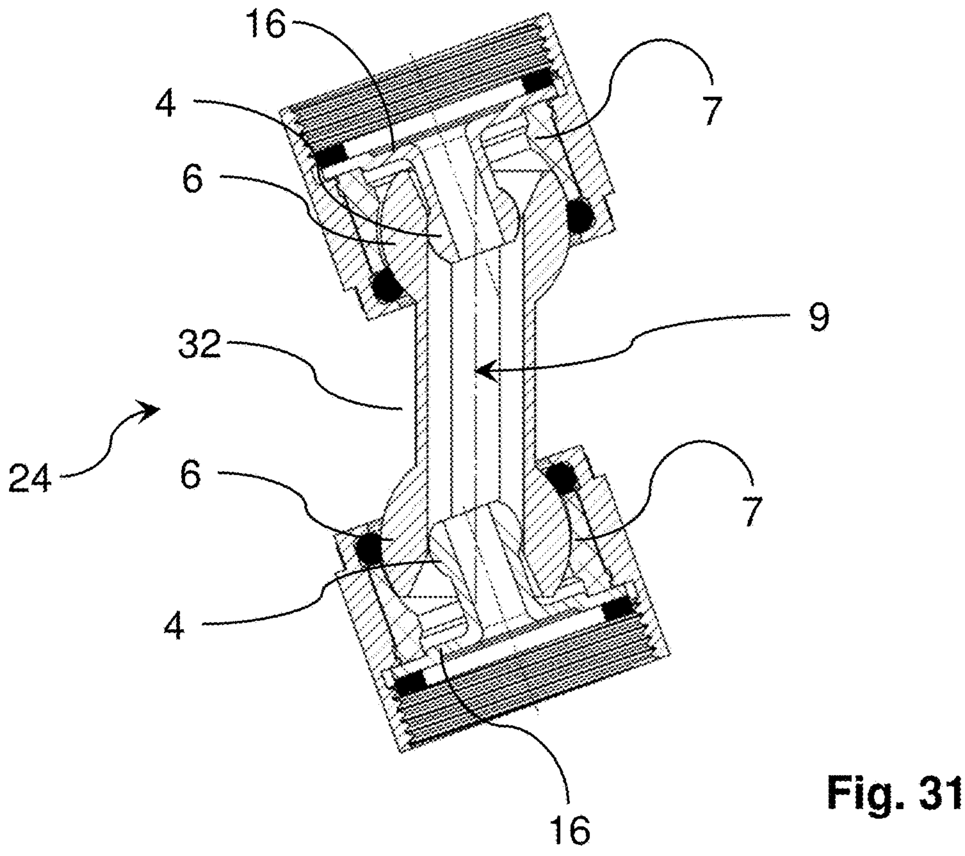
FIG. 31 shows the embodiment according to FIG. 30 in an axial sectional illustration.

FIGS. 30 and 31 as a type of application show the formation of a double joint 24 from two individual joints 1 which at their respective first joint elements 2 are rigidly connected to one another by way of a connecting piece 32.

Figure 32:
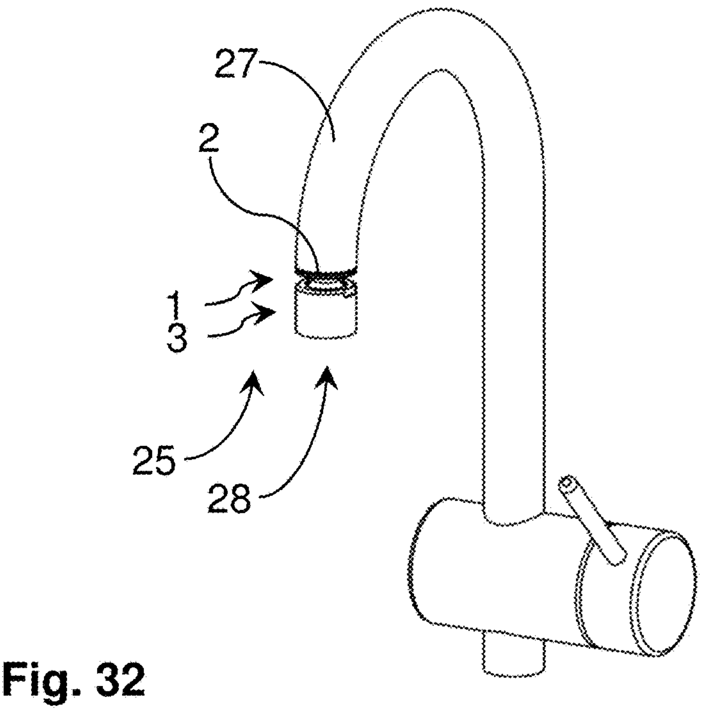
FIG. 32 shows a use of an embodiment according to the invention on a fitting.
Figure 33:
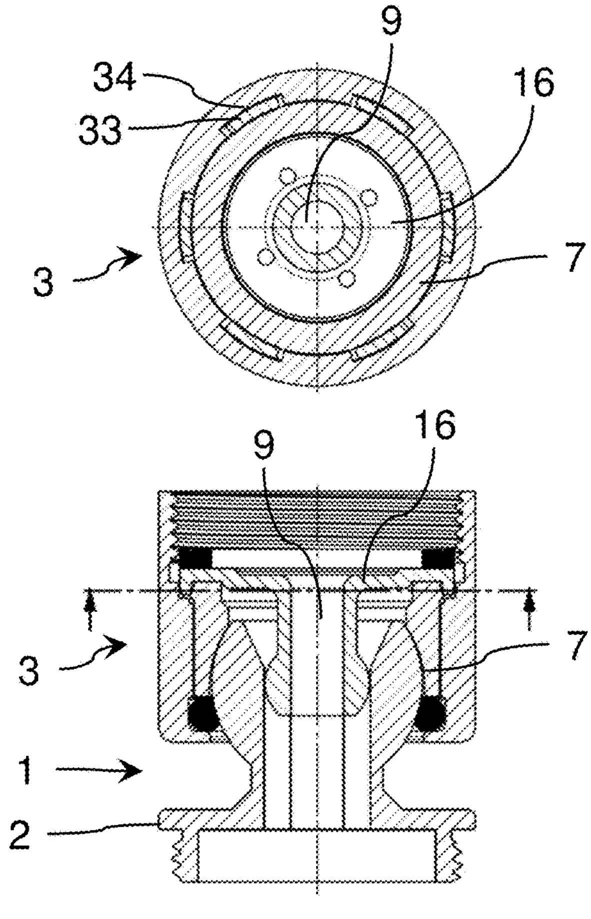
FIG. 33 shows a further embodiment according to the invention in an axial section (bottom) and a radial section (top)
Figure 34:
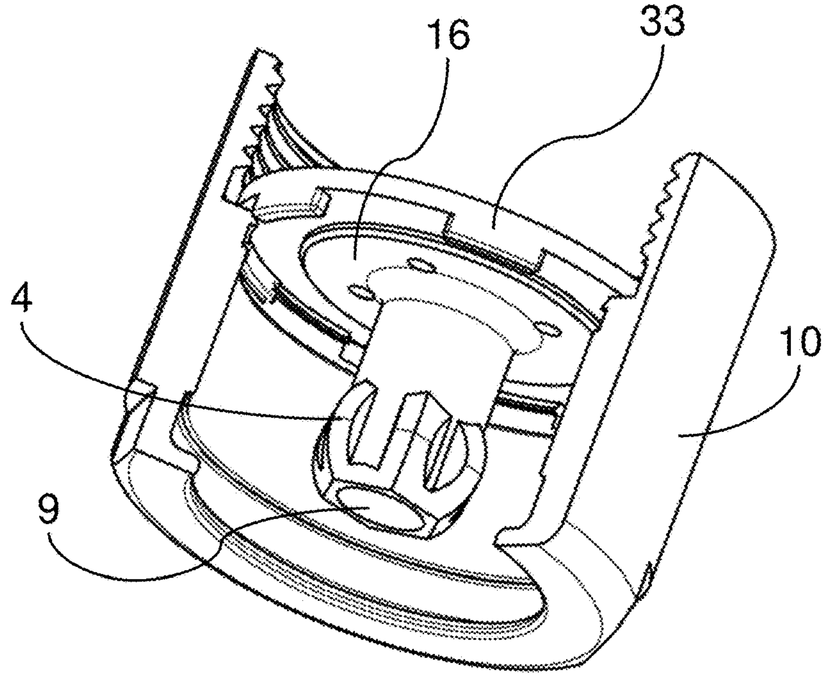
FIG. 34 shows part of the embodiment according to FIG. 33 in a partially sectional oblique view.
Figure 35:
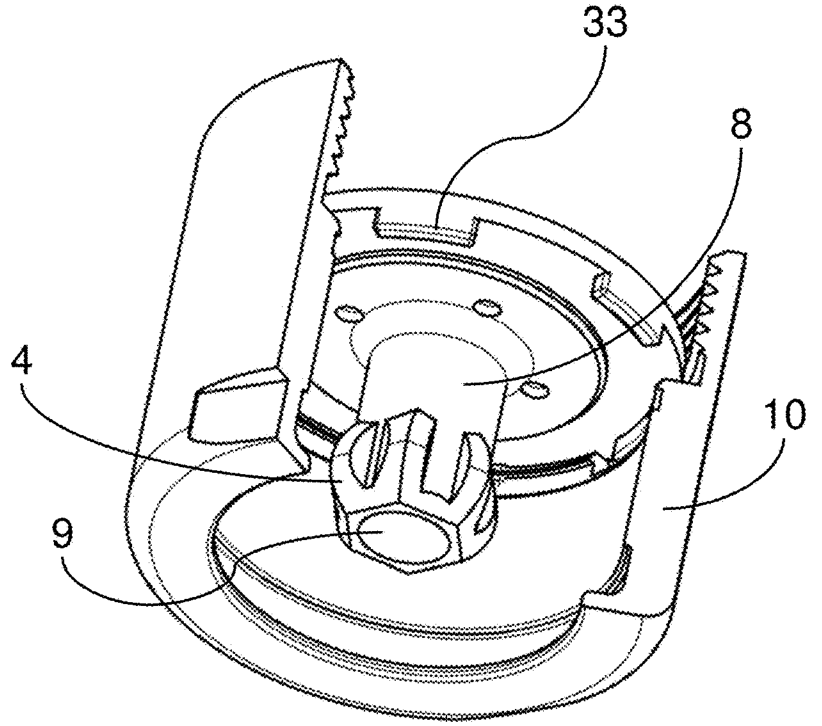
FIG. 35 shows the part from FIG. 34 of the embodiment according to FIG. 33 in a further oblique view.
Figure 36:
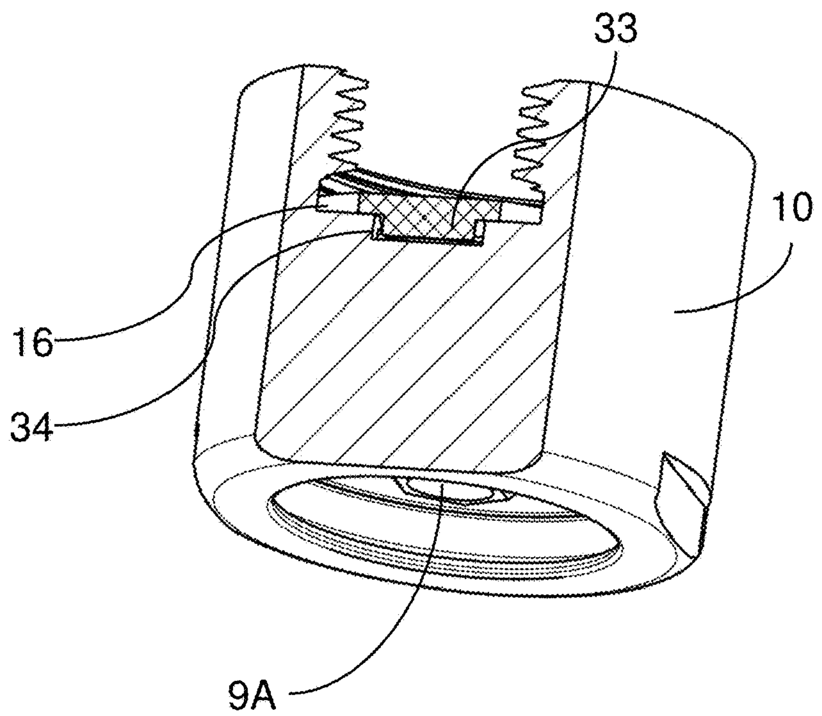
FIG. 36 shows the part from FIGS. 34 and 35 of the embodiment according to FIG. 33, in a sectional illustration along a secant line.

FIG. 32 shows a further use of a jet regulator 18 according to the invention. The first joint element 2 is of such a narrow design that no tool engagement space can be formed. The anti-twist device assists here in such a way that the first joint element 2 can be screwed in without tools.

FIGS. 33 to 36 show a further exemplary embodiment according to the invention. A co-rotational connection between the joint elements 2, 3 can be easily established here by a retaining profile 33 on the swivel head plate 16 and a corresponding mating retaining profile 34.

A further advantage lies in that the sleeve 10 can be easily screwed off without having to counteract on the swivel head neck 8 of the second swivel head 6, for example in order to clean the jet regulator 18.

The fluid duct 9, presently comprising a through-bore 9A through the swivel head neck 8, is likewise designed along the longitudinal axis 19. Rotating the first joint element 2 within the second joint element 3 is prevented by the anti-twist device described above. Switching the jet regulator 18 by rotating the at least one part of the jet regulator 18 does not result in a corresponding rotation of the first joint element 2 within the second joint element 3. The handling of the jet regulator connected to the joint 1 is thus improved. At the same time, pivoting the first joint element 2 within the second joint element 3, i.e. rotating about one axis or a plurality of axes transverse to the longitudinal axis 19 is furthermore possible as a result of the design of the anti-twist device described above, in particular as a result of the spherical design of the swivel head 4 about the longitudinal axis 19.

FIGS. 37 to 40 show a further exemplary embodiment according to the invention. In a manner similar to the swivel head plate 16 of the exemplary embodiment shown in FIGS. 33 to 36, the swivel head plate 16 of this exemplary embodiment has retaining profiles 33. As opposed to the retaining profiles 33 which are shown in FIGS. 33 to 36 and are of a cuboid or rectangular design, the retaining profiles 33 shown here have bevels. The retaining profiles 33 engage in corresponding receptacles, or mating retaining profiles 34, on the sleeve 10, wherein the mating retaining profiles 34 likewise have bevels. The bevels are designed in such a manner that parts meet during insertion, i.e. when the swivel head plate 16, or the swivel head 4, is inserted into the socket 7.

For this purpose, the retaining profiles 33 and mating profiles 34 have bevels in the circumferential direction, i.e. along a circular circumference of, or within, the swivel head plate 16 or of the sleeve 10, respectively. The retaining profiles 33 and mating profiles 34 have a bevel directed outward, i.e. along a radial direction of the swivel head plate 16 or of the sleeve 10, respectively. These bevels facilitate the engagement of the retaining profiles 33 in the mating profiles 34, or the latching of said retaining profiles 33 in the latter.

Figure 37:
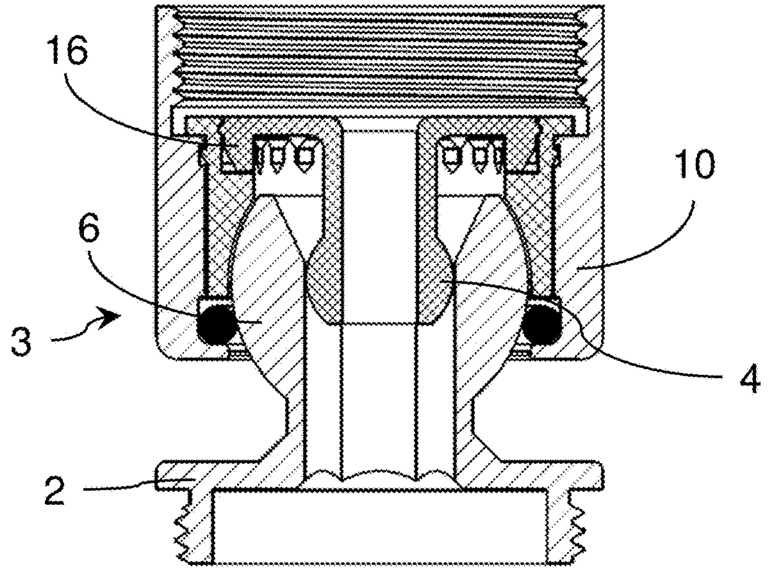
FIG. 37 shows a further embodiment according to the invention in an axial section.

As can be seen in FIG. 37, a sealing ring, such as the second sealing ring 15 mentioned above, for example, for connecting the second joint element 3 to a fitting in a sealing manner, can be squeezed when applying a torque to the swivel head 4, the swivel head plate 16 and/or the sleeve 10. This sealing ring 15 is designed in such a way that it slides on the screwed-on fitting and/or the swivel head plate 16, due to the coefficient of dynamic friction and/or coefficient of static friction, when a predefined limit torque is exceeded. This preserves the anti-twist device.

The swivel head plate 16 here is indeed co-rotationally connected to the socket 7, but can rotate in the sleeve 10 and thus relative to the thread 40 of the latter.

Figure 38:
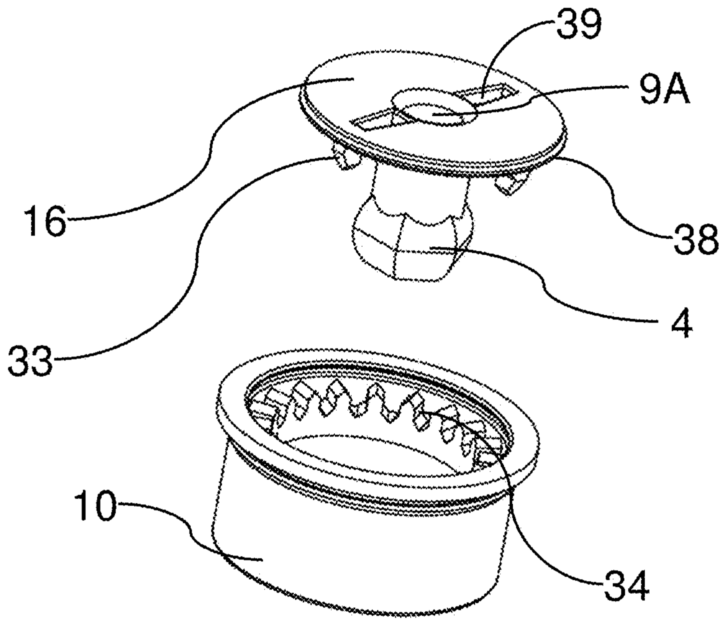
FIG. 38 shows part of the embodiment according to FIG. 37 in an oblique view.
Figure 39:
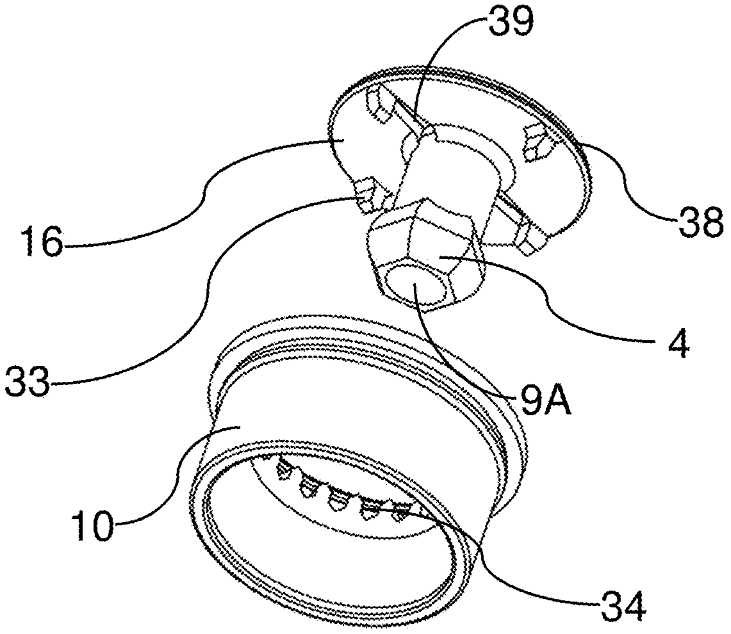
FIG. 39 shows the part of the embodiment according to FIG. 37 in a further oblique view.
Figure 40:
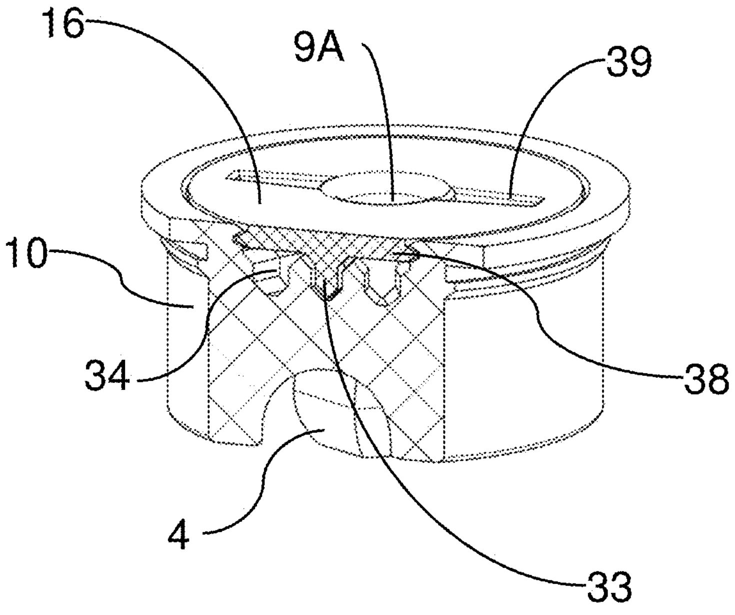
FIG. 40 shows the part from FIGS. 38 and 39 of the embodiment according to FIG. 37, in a sectional illustration along a secant line.

As can be seen particularly well in FIGS. 38 and 39, the swivel head plate 16 has an encircling rib 38. The rib 38 snaps into the sleeve 10. In other words: the rib 38 represents a protrusion which engages in a corresponding receptacle on the sleeve 10. The rib 38 does not prevent the rotation of the swivel head plate 16 relative to the sleeve 10. When the swivel head plate 16 is rotated relative to the sleeve 10, the rib 38 prevents the swivel head plate 16 moving relative to the sleeve 10 perpendicularly to and/or along the rotation axis.

As described already in the context of FIGS. 33 to 36, a connection between the joint elements 2 and 3 can be easily established by the retaining profile 33 on the swivel head plate 16 and the corresponding mating retaining profile 34, said connection being co-rotational when a torque is applied.

As can again be particularly well seen in FIGS. 38 and 39, the swivel head plate 16 in the exemplary embodiment shown has longitudinal slots 39 for the passage of water, instead of the through-bores 9B described above.

Figure 41:
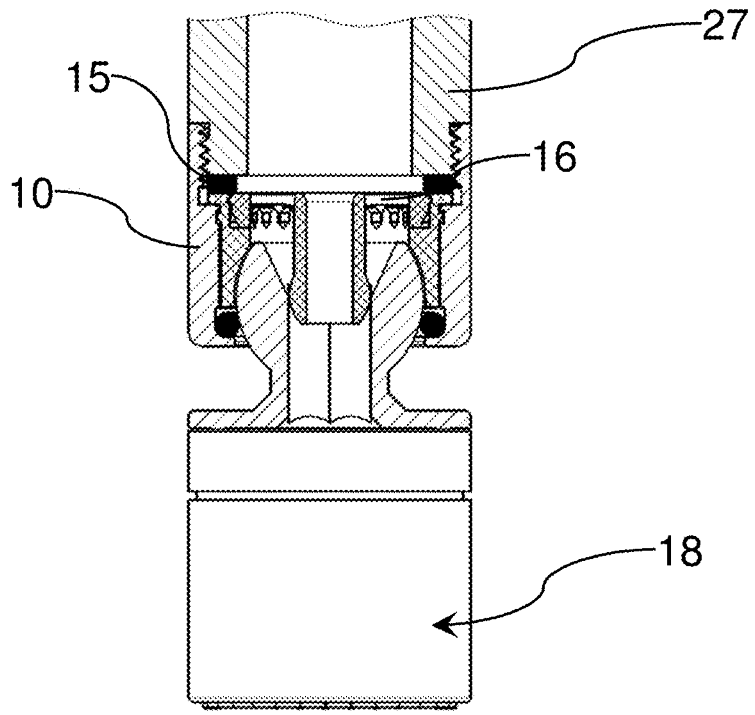
FIG. 41 shows the embodiment according to FIG. 37, connected to a jet regulator.

FIG. 41 shows the embodiment shown in FIGS. 37 to 40, in conjunction with a jet regulator, for example the jet regulator 18 described above.

LIST OF REFERENCE SIGNS

1 Joint
2 First joint element
3 Second joint element
4 First swivel head
5 Swivel head receptacle for the first swivel head
6 Second swivel head
7 Socket for the second swivel head
8 Swivel head neck of the first swivel head
9 Fluid line
9A First through-bore of the fluid line
9B Second through-bore of the fluid line
10 Sleeve
11 Internal thread of the sleeve
12 Planar surface of the sleeve (key surface)
13 External thread of the first joint element
14 First sealing ring
15 Second sealing ring
16 Swivel head plate
17 Bypass ducts
18 Jet regulator
19 Longitudinal axis of the joint
20 Pivot point
21 Connecting portion of the sleeve
22 Undercut on the socket
23 Groove
24 Double joint

25 Sanitary assembly
26 Tool engagement surface
27 Fitting
28 Changeover device
29 Shower head
30 Protrusion
31 Cutout
32 Connecting piece
33 Retaining profile
34 Mating retaining profile
35 Longitudinal axis of 2
36 Longitudinal axis of 3
37 Transverse axis
38 Rib
39 Longitudinal slots
40 Thread
41 Sleeve

The invention claimed is:

1. A joint (1) having a fluid line (9) disposed in an interior of the joint (1), the joint (1) comprising:
- a first joint element (2) and a second joint element (3) for receiving the first joint element (2), the first joint element (2) in the second joint element (3) being freely pivotable in space about a pivot point (20);
- wherein at least one of the first joint element (2) or the second joint element (3) comprises an anti-twist device (4, 5) which prevents the first joint element (2) from rotating about a longitudinal axis (19, 35, 36) within the second joint element (3), and
- wherein a friction clutch is formed at least one of on the anti-twist device or between the anti-twist device and a sleeve (10, 41) having a thread (40), and a sealing ring (15) at least one of enables the anti-twist device to rotate relative to the thread (40) when applying a torque above a limit torque, or rests on a part that is rotatable relative to the sleeve (10, 41).

2. The joint (1) as claimed in claim 1, wherein the anti-twist device (4, 5) comprises: a swivel head (4) which is disposed concentrically with the pivot point (20) and has a non-round internal or external contour and a swivel head receptacle (5) having a mating contour for receiving the swivel head (4).

3. The joint (1) as claimed in claim 2, wherein at least one of: a) the swivel head (4) is formed on the first joint element (2) or the second joint element (3) or is co-rotationally connected thereto, or b) the swivel head receptacle (5) is formed on the other joint element (2, 3) or is co-rotationally connected thereto.

4. The joint (1) as claimed in claim 3, wherein the co-rotational connection is implemented by a mutual engagement of a retaining profile (33) in a corresponding mating retaining profile (34).

5. The joint (1) as claimed in claim 2, wherein at least one of the non-round contour or the mating contour is designed to be polygonal.

6. The joint (1) as claimed in claim 2, wherein the swivel head (4), or a swivel head plate (16) on which the swivel head (4) is formed, comprises one or a plurality of through-bores (9A, 9B) as at least part of the fluid line (9).

7. The joint (1) as claimed in claim 2, wherein a swivel head plate (16) on which the swivel head (4) is formed comprises one or a plurality of longitudinal slots (39) as at least part of the fluid line (9).

8. The joint (1) as claimed in claim 2, wherein at least one of the swivel head (4) or the swivel head receptacle (5) comprises one or a plurality of bypass ducts (17) as at least part of the fluid line (9).

9. The joint (1) as claimed in claim 8, wherein the one or the plurality of bypass ducts (17) comprise one or a plurality of grooves on at least one of the swivel head (4) or on the swivel head receptacle (5).

10. The joint (1) as claimed in claim 2, wherein the swivel head (4) is of a solid design.

11. The joint (1) as claimed in claim 2, wherein the swivel head (4) is of a star-shaped design.

12. The joint (1) as claimed in claim 2, wherein the swivel head (4) is a first swivel head (4) and the first joint element (2) comprises a second swivel head (6), wherein the second swivel head (6) is able to be disposed in a socket (7) of the second joint element (3) and is pivotable freely in space about the pivot point (20).

13. The joint (1) as claimed in claim 12, wherein at least one of a) the swivel head receptacle (5) for the first swivel head (4) is disposed within the second swivel head (6), or b) the first swivel head (4) is comprised by the socket (7) or is co-rotationally connected thereto.

14. The joint (1) as claimed in claim 12, wherein the first joint element (2), the second joint element (3) or a sleeve (10) encompassing the first or the second joint element (3) comprises a connecting portion (21) having a thread (11) for connecting to a fitting, or for connecting to a jet regulator (18), and the first swivel head (4) is comprised by the sleeve (10) or is co-rotationally connected thereto.

15. The joint (1) as claimed in claim 1, wherein the anti-twist device (4, 5) is at least one of activatable or de-activatable by pivoting the joint (1) about a transverse axis (37).

16. The joint (1) as claimed in claim 1, wherein the anti-twist device is produced by a form-fit between the first joint element (2) and the second joint element (3).

17. The joint (1) as claimed in claim 1, further comprising at least one protrusion (30), which at least in one joint position engages in a cutout (31) on the other joint element (2, 3), formed in the first joint element (2) or the second joint element (3).

18. The joint (1) as claimed in claim 1, wherein the first joint element (2), the second joint element (3) or a sleeve (10) encompassing the first or the second joint element (3) comprises a connecting portion (21) having a thread (11) for connecting to a fitting, or for connecting to a jet regulator (18).

19. The joint (1) as claimed in claim 18, wherein the sleeve (10) comprises at least one planar outside surface (12).

20. The joint (1) as claimed in claim 1, wherein an inner tool engagement surface (26) is formed on at least one of the first joint element (2) or on the second joint element (3).

21. A double joint (24) comprising two of the joints (1) as claimed in claim 1, wherein the first joint elements (2) or the second joint elements (3) are rigidly connected to one another.

22. A sanitary assembly (25) having a joint (1) as claimed in claim 1, wherein a rotationally adjustable changeover device (28) is disposed on the first joint element (2) or the second joint element (3).

23. A joint (1) with a fluid line (9) arranged inside the joint (1), the joint (1) comprising:
- a first joint element (2); and
- a second joint element (3) for accommodating the first joint element (2),
- wherein the first joint element (2) is freely pivotable in the second joint element (3) about a pivot point (20) in space, wherein the first joint element (2) and/or the second joint element (3) comprises an anti-rotation device (4, 5) which prevents the first joint element (2) from rotating within the second joint element (3) about a longitudinal axis (19, 35, 36), wherein the longitudinal axis (19, 35, 36) is arranged longitudinally to the fluid line (9), wherein the anti-rotation device (4, 5) comprises:

a first joint head (4) arranged concentrically to the pivot point (20) with a non-circular outer contour, and a joint head receptacle (5) with a counter-contour corresponding to the non-circular outer contour for accommodating the first joint head (4), wherein the first joint element (2) comprises a second joint head (6), and wherein the joint head receptacle (5) for the first joint head (4) is arranged inside the second joint head (6).

* * * * *